US012172280B2

(12) United States Patent
Kawai et al.

(10) Patent No.: US 12,172,280 B2
(45) Date of Patent: Dec. 24, 2024

(54) TOOL-HOLDING APPARATUS, IMPACT DRIVER, AND ELECTRIC WORK MACHINE

(71) Applicant: MAKITA CORPORATION, Anjo (JP)

(72) Inventors: Yasuhito Kawai, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/136,362

(22) Filed: Apr. 19, 2023

(65) Prior Publication Data

US 2023/0249264 A1 Aug. 10, 2023

Related U.S. Application Data

(62) Division of application No. 16/934,296, filed on Jul. 21, 2020, now Pat. No. 11,660,681.

(30) Foreign Application Priority Data

Jul. 23, 2019 (JP) .................................. 2019-135063

(51) Int. Cl.
*B25D 16/00* (2006.01)
*B25B 21/02* (2006.01)
(Continued)

(52) U.S. Cl.
CPC .............. *B25D 16/00* (2013.01); *B25B 21/02* (2013.01); *B25D 17/06* (2013.01); *B25D 17/088* (2013.01); *B23B 31/1071* (2013.01)

(58) Field of Classification Search
CPC ...... B25D 16/00; B25D 17/06; B25D 17/088; B25B 21/02
See application file for complete search history.

(56) References Cited

U.S. PATENT DOCUMENTS 4,184,692 A 1/1980 Benson et al.
5,398,946 A 3/1995 Quiring
(Continued)

FOREIGN PATENT DOCUMENTS

EP 1506843 B1 6/2008
JP S56160769 U 11/1981
(Continued)

OTHER PUBLICATIONS

Office Action from the Japanese Patent Office dispatched Feb. 14, 2023 in related Japanese application No. 2019-135063, and machine translation thereof.

(Continued)

*Primary Examiner* — Nathaniel C Chukwurah
(74) *Attorney, Agent, or Firm* — J-TEK LAW PLLC; Jeffrey D. Tekanic; Scott T. Wakeman

(57) ABSTRACT

A tool-holding apparatus (70) includes an engaging member (71) for engaging a tool accessory (B) and being movably supported in axial and radial directions in a rotational-output shaft (26) having an insertion hole (81) for holding the tool accessory (B). A first biasing member (72) biases the engaging member towards engagement with the engaging member. A bit sleeve (73) is movable in the axial direction along an outer-circumferential surface of the rotational-output shaft between a blocking position at which radial outward movement of the engaging member is blocked and a permitting position at which radial outward movement of the engaging member is permitted. A second biasing member (74) biases the bit sleeve toward the blocking position. A positioning part (75) is fixed on the outer-circumferential surface of the rotational-output shaft and stops the bit sleeve at the blocking position. The bit sleeve has a projection (88), which is disposed on the forward side of the first biasing (Continued)

member, extends inward in the radial direction, and slidably contacts the rotational-output shaft.

20 Claims, 11 Drawing Sheets

(51) Int. Cl.
*B25D 17/06* (2006.01)
*B25D 17/08* (2006.01)
*B23B 31/107* (2006.01)

(56) References Cited

U.S. PATENT DOCUMENTS

| | | | |
|---|---|---|---|
| 9,114,514 B2 * | 8/2015 | Leong | B25B 21/00 |
| 9,469,020 B2 | 10/2016 | Funk et al. | |
| 2005/0036844 A1 | 2/2005 | Hirt et al. | |
| 2005/0235785 A1 | 10/2005 | Chang | |
| 2006/0163824 A1 | 7/2006 | Sasaki et al. | |
| 2007/0120331 A1 | 5/2007 | Manschitz et al. | |
| 2009/0309316 A1 | 12/2009 | Hu | |
| 2010/0176561 A1 | 7/2010 | Braun et al. | |
| 2011/0233878 A1 | 9/2011 | Wan et al. | |
| 2012/0326399 A1 * | 12/2012 | Lin | B25B 23/0057 279/75 |
| 2012/0326401 A1 * | 12/2012 | Puzio | B25B 23/0057 279/75 |
| 2013/0134684 A1 | 5/2013 | Funk et al. | |
| 2014/0312578 A1 | 10/2014 | Puzio et al. | |
| 2019/0262978 A1 | 8/2019 | Tejima et al. | |
| 2020/0009709 A1 | 1/2020 | Kumagai et al. | |
| 2022/0001523 A1 | 1/2022 | Kollmann et al. | |

FOREIGN PATENT DOCUMENTS

| | | |
|---|---|---|
| JP | S58160774 A | 9/1983 |
| JP | 2001054874 A | 2/2001 |
| JP | 3652918 B2 | 5/2005 |
| JP | 2006198755 A | 8/2006 |
| JP | 3146887 U | 12/2008 |
| JP | 2010046787 A | 3/2010 |
| JP | 2012245611 A | 12/2012 |
| JP | 2016107375 A | 6/2016 |
| JP | 2016215373 A | 12/2016 |

OTHER PUBLICATIONS

Search Report from the Japanese Patent Office dispatched Jan. 31, 2023 in related Japanese application No. 2019-135063, and machine translation thereof.

Office Action from the Japanese Patent Office dispatched Jul. 4, 2023 in related Japanese application No. 2019-135063, and machine translation thereof.

* cited by examiner

TOOL-HOLDING APPARATUS, IMPACT DRIVER, AND ELECTRIC WORK MACHINE

CROSS-REFERENCE

The present application is a divisional of U.S. patent application Ser. No. 16/934,296 filed on Jul. 21, 2020, now U.S. Pat. No. 11,660,681, which claims priority to Japanese patent application serial number 2019-135063 filed on Jul. 23, 2019, the contents of which are incorporated fully herein by reference.

TECHNICAL FIELD

The present invention generally relates to a tool-holding apparatus (also known as a tool holder or tool accessory holder, such as a tool bit holder or tool chuck), an impact driver, and an electric work machine.

BACKGROUND ART

In known electric work machines, such as power tools (e.g., impact drivers, driver drills, etc.), a tool accessory (e.g., a bit, such as a driver bit, a drill bit, or socket bit) is detachably mounted in a rotational-output shaft (e.g., an anvil or a spindle) by utilizing a tool-holding apparatus or tool holder, such as a chuck. To mount the tool accessory in the tool-holding apparatus, the tool accessory is inserted into the rotational-output shaft until a portion of the tool accessory (e.g., a circumferential groove) engages with at least one engaging member (e.g., a ball) disposed in the rotational-output shaft. The tool accessory is demounted (removed) from the tool-holding apparatus by disengaging the engaging member from the tool accessory and withdrawing the tool accessory from the tool-holding apparatus. One known example of such a tool-holding apparatus is disclosed in Japanese Patent No. 3652918.

SUMMARY OF THE INVENTION

In the following description of Japanese Patent No. 3652918, all reference numbers in parentheses refer to reference numbers in the drawings of Japanese Patent No. 3652918. Thus, in Japanese Patent No. 3652918, an inner-circumferential surface of a rear portion of a tool sleeve (35) contacts a tool holder (31). When the inner-circumferential surface of the rear portion of the tool sleeve (35) contacts the tool holder (31), movement of the tool sleeve (35) in a radial direction of the tool holder (31) is restricted. On a forward side of the portion along which the tool sleeve (35) and the tool holder (31) contact one another, the tool holder (31) narrows, and the tool sleeve (35) and the tool holder (31) do not contact one another along the narrowed portion. Narrowing of the front end of the tool holder (31) increases the likelihood that, when an impact is received in the rotational direction, cracks will form in the narrowed portion of the tool holder (31).

In addition, because the inner-circumferential surface of the rear portion of the tool sleeve (35) contacts the tool holder (31), if an attempt were made to insert a bit (40) into the tool holder (31) while the tool sleeve (35) has been moved axially forward relative to the tool holder (31), there is a possibility that the inner-circumferential surface of the rear portion of the tool sleeve (35) would adversely block movement of balls (32) outward in the radial direction. As a result, the bit (40) can not be inserted into the tool holder (31) while the tool sleeve (35) has been moved (pulled) axially forward relative to the tool holder (31).

It is therefore one non-limiting object of the present teachings to disclose one or more techniques for improving the durability of a rotational-output shaft of a tool-holding apparatus, which may be utilized with an impact driver or another type of electric work machine. In addition or in the alternative, another non-limiting object of the present teachings is to enable a tool accessory (bit) to be smoothly inserted into the rotational-output shaft of the tool-holding apparatus, regardless of the axial position of a bit sleeve relative to the rotational-output shaft.

In one non-limiting aspect of the present teachings, a tool-holding apparatus or bit holder comprises: one or more engaging members, which is (are) supported by (in) a rotational-output shaft so as to be movable in an axial direction and in a radial direction of the rotational-output shaft, which has an insertion hole, into which a tool accessory (bit) is insertable from a forward side, the engaging member(s) being capable of engaging with (in) the tool accessory; a first biasing member, which biases the engaging member(s) in a direction (e.g., an axially forward direction) that causes the engaging member(s) to engage with (in) the tool accessory; a bit sleeve, which is movable in the axial direction along an outer-circumferential surface of the rotational-output shaft and is movable between a blocking position at which movement of the engaging member outward in the radial direction is blocked and a permitting position at which movement of the engaging member outward in the radial direction is permitted; a second biasing member, which biases the bit sleeve toward the blocking position; and a positioning part, which is fixed to (on) the outer-circumferential surface of the rotational-output shaft and contacts (positions) the bit sleeve at the blocking position; wherein the bit sleeve has a projection, which is disposed on the forward side of the first biasing member, extends inward in the radial direction, and is configured/adapted to (slidably) contact the rotational-output shaft.

In embodiments according to the above-mentioned aspect of the present teachings, improved robustness and/or durability of the rotational-output shaft can be achieved. In addition or in the alternative, the tool accessory can be smoothly inserted into the rotational-output shaft regardless of the axial position of the bit sleeve relative to the rotational-output shaft.

DETAILED DESCRIPTION OF THE EMBODIMENTS

Figure 1:
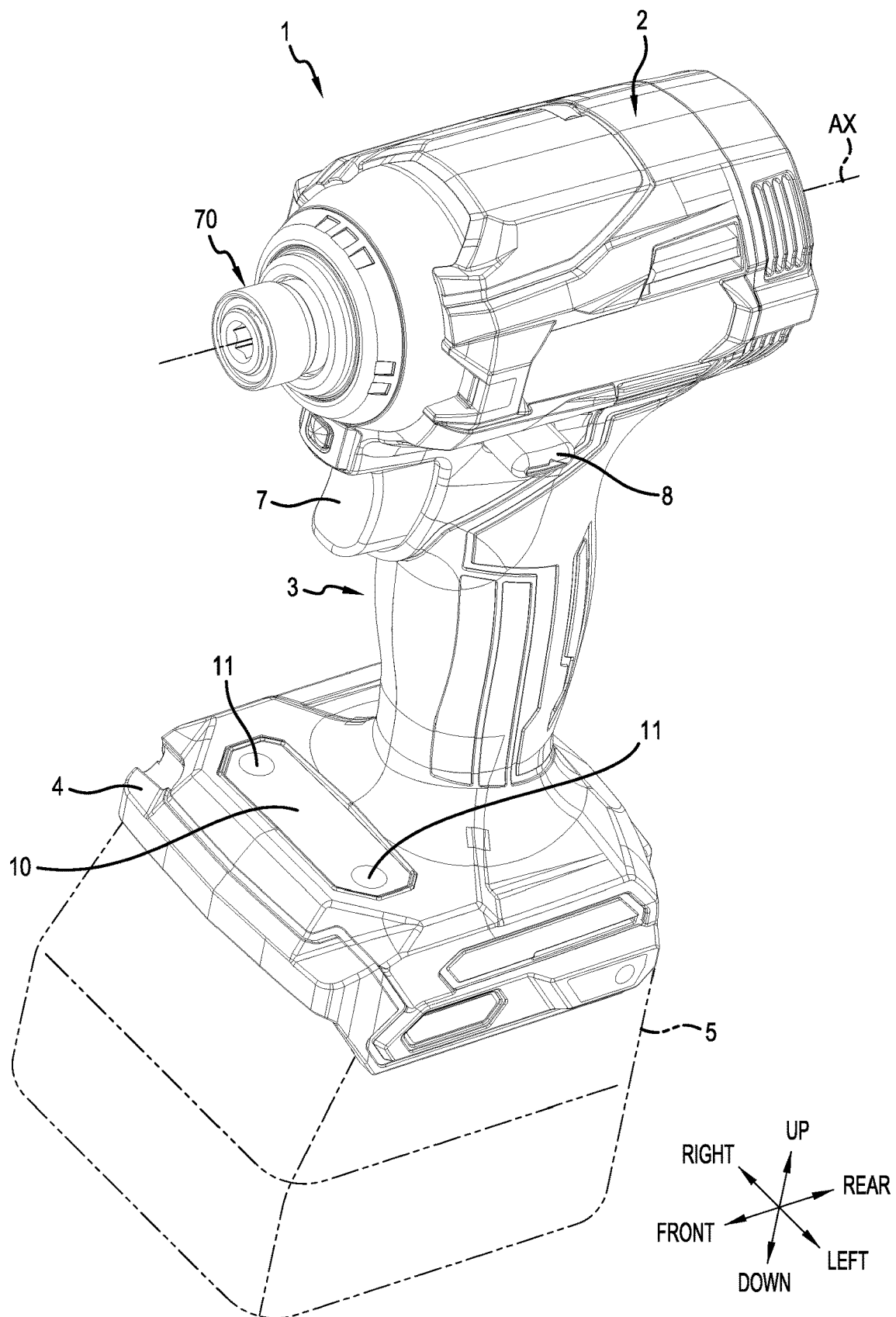
FIG. 1 is an oblique view of an impact driver according to an exemplary embodiment of the present teachings.

Embodiments according to the present teachings will be explained below, with reference to the drawings, although the present invention is not limited to the following exemplary embodiments. Structural elements of the embodiments explained below can be combined where appropriate. In addition, there are also situations in which some structural elements are not used.

In the exemplary embodiment shown in the drawings (hereinafter "the present embodiment"), the positional relationships among parts are explained using the terms "left," "right," "front," "rear," "up," and "down." These terms indicate relative position or direction, using a center of an electric work machine 1 as a reference. In the present embodiment, the electric work machine 1 is an impact driver.

In the present embodiment, the direction parallel to, or coinciding with, the rotational axis AX of an anvil 26 is called the "axial direction" where appropriate. In addition, the direction that goes (circles) around the rotational axis AX is called the "circumferential direction" where appropriate. Furthermore, the directions perpendicular to the rotational axis AX are called the "radial direction" where appropriate. In addition, in the radial direction, a location near or a direction that approaches (moves towards) the rotational axis AX is called "inward in the radial direction" or "radially inward" where appropriate, whereas a location distant from or a direction leading away from the rotational axis AX is called "outward in the radial direction" or "radially outward" where appropriate.

In the present embodiment, the rotational axis AX extends in (e.g., is parallel to or coincides with) the front-rear direction.

Overall Structure of an Impact Driver of the Present Embodiment

FIG. 1 is an oblique view that shows the exterior appearance of the impact driver 1 according to the present embodiment. As shown in FIG. 1, the impact driver 1 comprises: a main body 2; a grip 3, which protrudes downward from the main body 2; a battery-mounting part 4, which is provided on (at) a lower-end portion of the grip 3; and an operation panel (switch panel) 10, which comprises a plurality of manipulatable switches 11 and optionally one or more display parts, such as one or more discrete lamps and/or a display screen, such as a touch screen. In addition, the impact driver 1 comprises: a trigger switch 7, which protrudes forward from an upper portion of the grip 3; and a forward/reverse-changing lever (reversing switch lever) 8, which is disposed at an upper portion of the grip 3 and changes the rotational direction of a motor (see below). A battery pack 5 is mounted on the battery-mounting part 4. The battery pack 5 contains a plurality of battery cells. Each battery cell is composed of, for example, a lithium-ion battery.

Internal Structure of the Impact Driver

Figure 2:
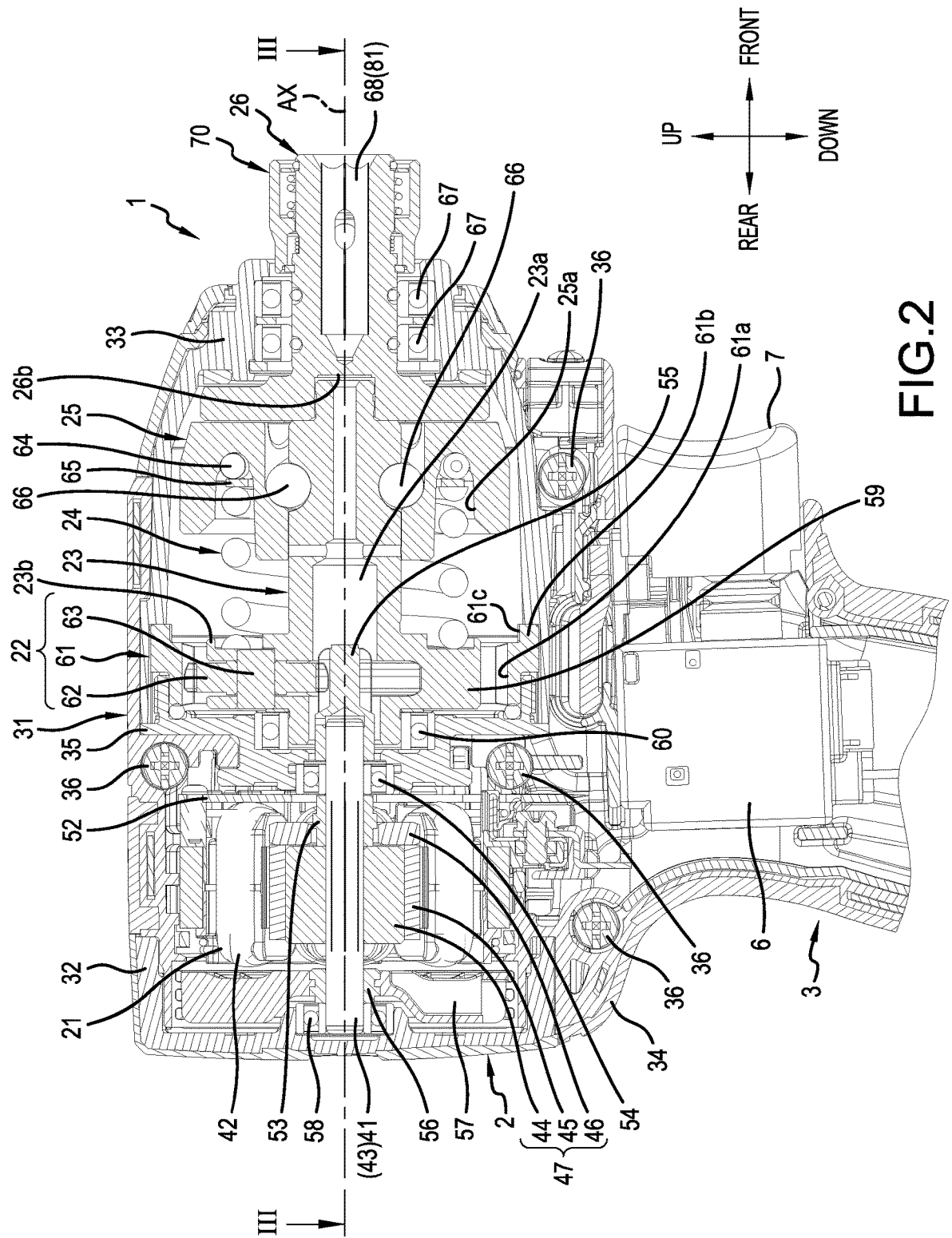
FIG. 2 is a longitudinal, cross-sectional view of the impact driver of FIG. 1.
Figure 3:
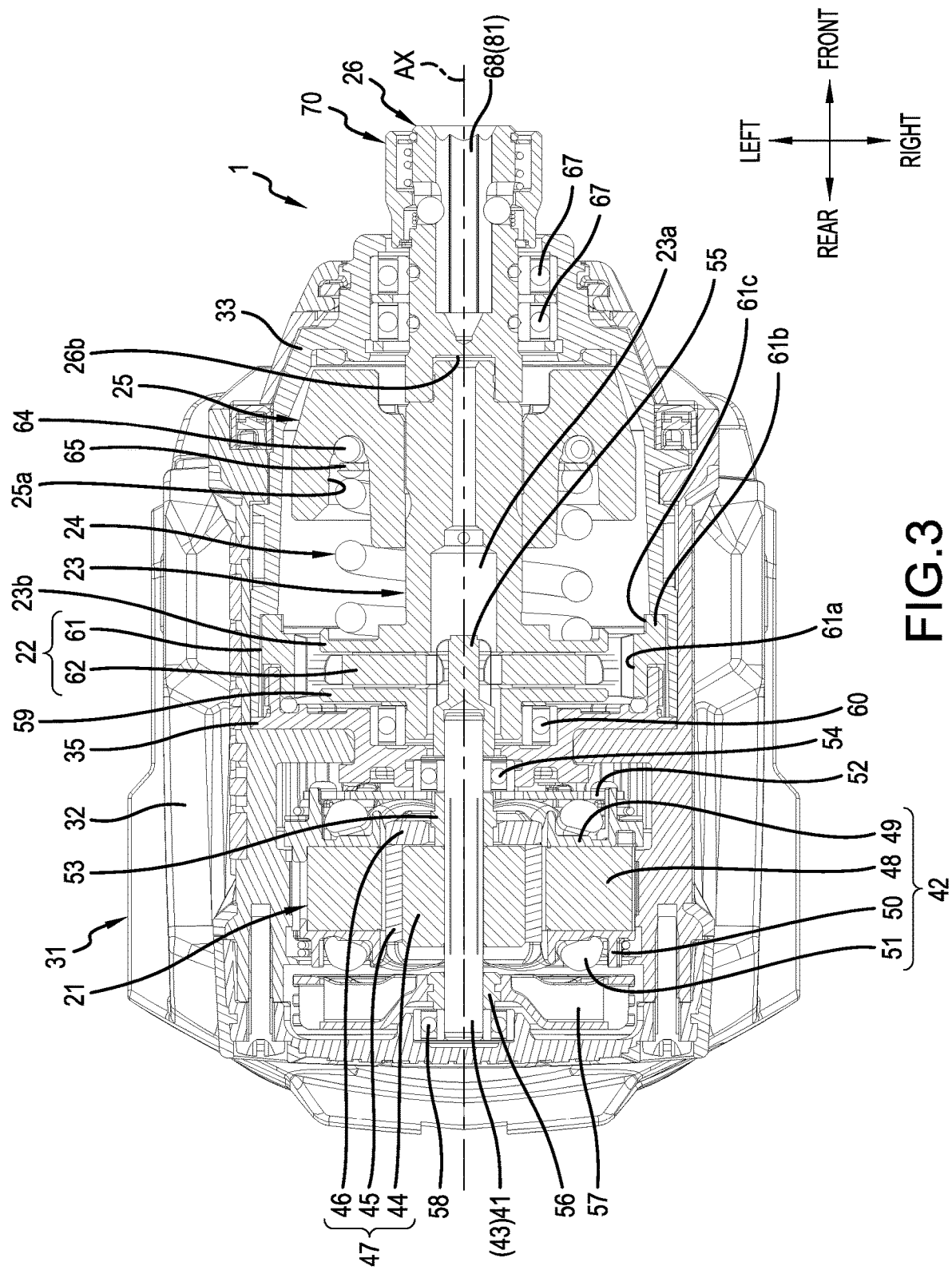
FIG. 3 is a cross-sectional view taken along line III-III in FIG. 2.

FIG. 2 is a longitudinal, cross-sectional view of the impact driver 1 according to the present embodiment. FIG. 3 is a cross-sectional view taken along line III-III in FIG. 2.

The impact driver 1 comprises: a housing 31; a motor 21; a planetary-gear (speed-reducing) mechanism 22; a spindle 23; a spring 24, which has a coil shape and is an elastic body; a hammer 25; the anvil 26 (rotational-output shaft); and a tool-holding apparatus (tool holder or bit holder) 70.

The housing 31 comprises a motor housing 32, a hammer case 33, and a grip housing 34.

The motor housing 32 houses the motor 21 and the planetary-gear mechanism 22. The motor housing 32 comprises: a left motor housing half, which has a half-split tubular shape; a right motor housing half, which has a half-split tubular shape and is connected to the left motor housing; and a rear motor housing.

The hammer case 33 is disposed on the forward side of the motor housing 32. The hammer case 33 houses the spindle 23, the spring 24, the hammer 25, and the anvil 26. The hammer case 33 has a tube shape. An inner diameter of a front portion of the hammer case 33 is smaller than an inner diameter of a rear portion of the hammer case 33.

A rear-end portion of the hammer case 33 is mated to an inner side of a front portion of the motor housing 32. The motor housing 32 and the hammer case 33 are connected to one another via a bearing retainer 35. The bearing retainer 35 is made of metal and has a bottomed, circular-tube shape. The hammer case 33 and the bearing retainer 35 form (define) an interior space in which the planetary-gear mechanism 22 is disposed.

The grip housing 34 is provided on a lower portion of the motor housing 32. The grip housing 34 and the motor housing 32 are one body. The grip housing 34 comprises a left grip housing half that is joined (screw fastened) to a right grip housing half. The motor housing 32, the hammer case 33, and the grip housing 34 are fixed (secured together) by a plurality of screws 36.

The motor 21, the planetary-gear mechanism 22, the spindle 23, the spring 24, the hammer 25, and the anvil 26 are each disposed along the rotational axis AX. A rotary shaft of the motor 21, a rotary shaft of the spindle 23, and the rotational axis AX of the anvil 26 coincide with one another. As was noted above, the rotational axis AX extends in the front-rear direction. The driving force generated by the motor 21 is operably coupled to the anvil 26 to rotate the anvil 26. The tool-holding apparatus 70 is provided on (at) a tip portion of the anvil 26. In addition, the impact driver 1 comprises a switch box 6, which is connected to the trigger 7.

The motor 21 is the drive source of the impact driver 1. The rotational-driving force of the motor 21 is reduced in speed by the planetary-gear mechanism 22 and transmitted to the spindle 23. The spindle 23 and the hammer 25 are rotated by the motor 21. The rotational-driving force transmitted to the spindle 23 is converted into a rotational-impact force by the hammer 25. The anvil 26 is configured to contact (continuously engage at lower torque and intermittently strike at higher torque) the hammer 25 in the rotational direction. The rotational-impact force of the hammer 25 is transmitted to the anvil 26. The anvil 26 receives the rotational-impact force and rotates about rotational axis AX.

The motor 21 is a brushless DC motor that comprises a rotor 41 disposed inward of a stator 42. The rotor 41 comprises a rotor shaft 43, a rotor core 44, permanent magnets 45, and permanent magnets 46 for sensing. The rotor shaft 43 rotates about the rotational axis AX. The rotor core 44 has a circular-cylindrical shape and is fixed to an outer-circumferential portion of the rotor shaft 43. The permanent magnets 45 are arranged in a generally circular-cylindrical shape overall and are disposed on an outer side of the rotor core 44. The permanent magnets 46 for sensing are disposed radially on the forward side of the rotor core 44 and of the permanent magnets 45. The rotor core 44, the permanent magnets 45, and the permanent magnets 46 for sensing constitute a rotor assembly 47.

The stator 42 comprises a stator core 48, a front insulating member 49, a rear insulating member 50, a plurality of drive coils 51, and a sensor board 52. The front insulating member 49 is disposed forward of the stator core 48. The rear insulating member 50 is disposed rearward of the stator core 48. The drive coils 51 are wound on the front insulating member 49 and the rear insulating member 50 and on the stator core 48. The sensor board 52 is fixed to the front insulating member 49. The sensor board 52 comprises a plurality of magnetic sensors that sense the permanent magnets 46 for sensing. A plurality of coil-connection parts (short-circuit members), which electrically connect the drive coils 51 and the sensor board 52, is provided on a circumferential edge of a front surface of the front insulating member 49.

The rotor 41 is rotatably supported by a front rotor bearing 54 and a rear rotor bearing 58. The rotor 41 comprises a polymer (resin) sleeve 53, which has a circular-tube shape. The front rotor bearing 54 is supported, forward of the polymer sleeve 53, by the bearing retainer 35. The rear rotor bearing 58 is disposed rearward of the motor housing 32 and is supported by the rear housing.

The motor housing 32 has air-exhaust ports (not shown). Rearward of the rotor core 44, a fan 57 for cooling is mounted on the rotor 41 via an insert bushing 56. The insert bushing 56 is press-fitted onto the rotor 41. Owing to the rotation of the fan 57, air inside the motor housing 32, which has been drawn in via air-intake ports (not shown), is exhausted externally via the air-exhaust ports.

The planetary-gear mechanism 22 comprises an internal gear 61, a plurality of planet gears 62, which mesh with the internal gear 61, and a plurality of pins 63, which respectively support the planet gears 62 so that the planet gears 62 respectively rotate about the pins 63. The internal gear 61 is generally cylindrical-shaped and comprises: radially-inward-facing teeth 61a; a front part 61b, which is disposed forward of the teeth 61a; and a recess 61c, which is provided on an inner-circumference side of the front part 61b. A plurality of protruding parts is provided, at prescribed spacings in the circumferential direction, on an outer-circumferential portion of the front part 61b. When the protruding parts mate with corresponding recesses provided in an inner-circumferential portion of the hammer case 33, the internal gear 61 is fixed to the hammer case 33 such that the internal gear 61 is non-rotatable relative to the hammer case 33.

The hammer 25 faces (is adjacent to) the internal gear 61 in the axial direction. The internal gear 61 is mounted on a front portion of the bearing retainer 35 in a non-rotatable manner. The planet gears 62 and the pins 63 are disposed inward of a flange 59. The planet gears 62 are supported, by the pins 63, such that the planet gears 62 are rotatable relative to the flange 59 of the spindle 23. Some of the external teeth of the planet gears 62 protrude outward from the flange 59.

A rear-end portion of the spindle 23 is rotatably supported by a spindle bearing 60, which is held by the bearing retainer 35. The flange 59, which is hollow and has a discoidal (disk) shape, is provided on the rear-end portion of the spindle 23. A portion of the planetary-gear mechanism 22 is disposed on the rear-end portion of the spindle 23.

The spindle 23 has a spindle hole 23a. A tip portion of the rotor shaft 43 is inserted into the spindle hole 23a. A pinion 55 is disposed on the tip portion of the rotor shaft 43. The pinion 55 meshes with the plurality of planet gears 62. A spring-seat projection 23b having a ring shape is provided on a front portion of the flange 59. A rear-end portion of the spring 24 contacts the spring-seat projection 23b.

The hammer 25 has a hollow part 25a, which is hollowed forward from a rear surface of the hammer 25 such that the hollow part 25a has a tube shape. A plurality of balls 64 and a hammer washer 65 are mounted in the hollow part 25a. A front-end portion of the spring 24 is inserted into the hollow part 25a and contacts the hammer washer 65. Balls 66 are interposed between the spindle 23 and the hammer 25. When an impact occurs, the hammer 25 is guided in the front-rear direction by the balls 66.

The anvil 26 is disposed on the forward side of the hammer 25. A pair of radially-extending extension parts 26a is provided on a rear-end portion of the anvil 26. Anvil bearings 67 are mounted on the hammer case 33. The anvil 26 is supported by the anvil bearings 67 such that the anvil 26 is rotatable about the rotational axis AX. The anvil 26 is supported by the hammer case 33 such that the anvil 26 is undisplaceable in the radial direction. A hole 26b is formed in the rear-end portion of the anvil 26. A front-end portion of the spindle 23 mates with the hole 26b. A chuck 68, which receives a bit B (tool accessory), is provided on the front-end portion of the anvil 26. The chuck 68 (i.e. the anvil 26) includes an axially-extending insertion hole 81, into which the bit B is inserted.

The tool-holding apparatus 70, which holds the bit B, is provided on the front-end portion of the anvil 26. The tool-holding apparatus 70, together with the chuck 68, may alternatively be called a tool chuck or drive chuck. In embodiments that hold, e.g., a hexagonal driver bit and/or a hexagonal socket bit, the tool-holding apparatus and the chuck may be called a hex drive chuck.

Operation of Impact Driver 1

When a user grasps the grip (handle) 3 and manipulates (pulls) the trigger switch 7, electric power is supplied from the battery pack 5 to the motor 21, whereby the rotor shaft 43 rotates. When the rotor shaft 43 rotates, the rotational-driving force thereof is transmitted to the planet gears 62 via the pinion 55, and the planet gears 62 mesh with the internal gear 61 and thereby revolve while rotating. The rotational-driving force of the rotor shaft 43 is reduced in speed by the planet gears 62 and is transmitted to the spindle 23 via the pins 63. If the anvil 26 receives a torque that is a prescribed threshold or greater, then the hammer 25 is guided by the balls 66. That is, the hammer 25 moves rearward while rotating in reverse. Subsequently, the hammer 25 rotates while moving forward owing to the biasing force of the spring 24. Owing to the hammer 25 rotating while moving, the anvil 26 is impacted (struck) in the rotational direction by the hammer 25.

Structure of Tool-Holding Apparatus 70

Figure 4:
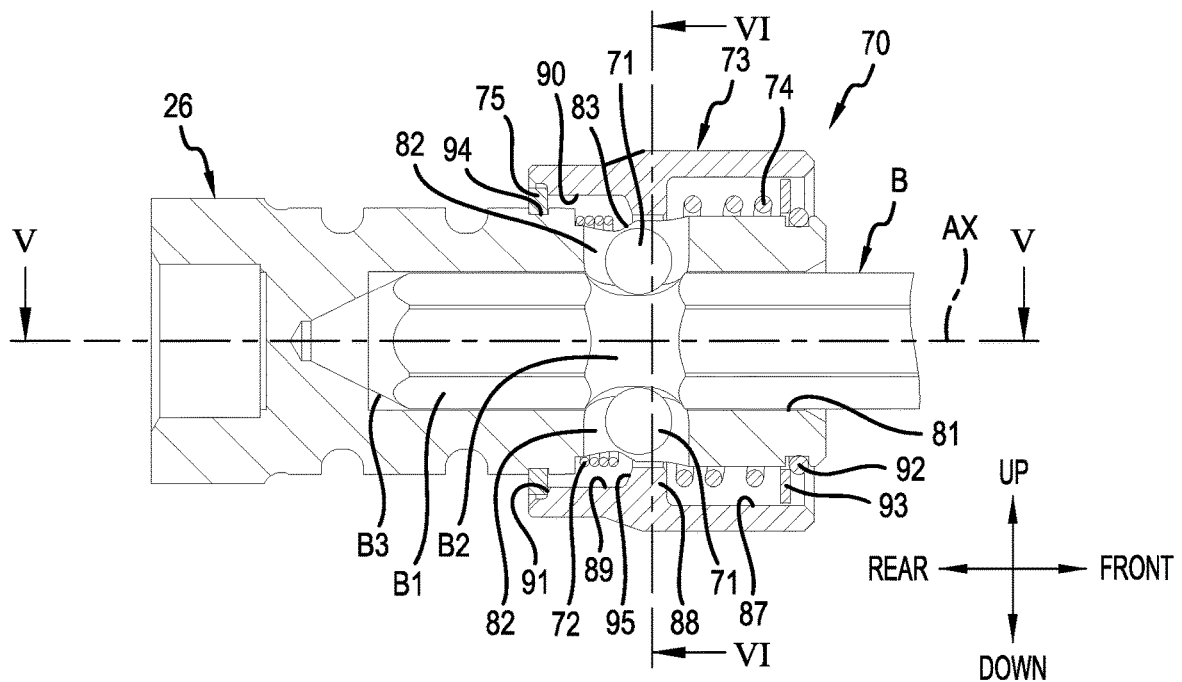
FIG. 4 is a longitudinal, cross-sectional view that shows a tool-holding apparatus according to the exemplary embodiment in greater detail.
Figure 5:
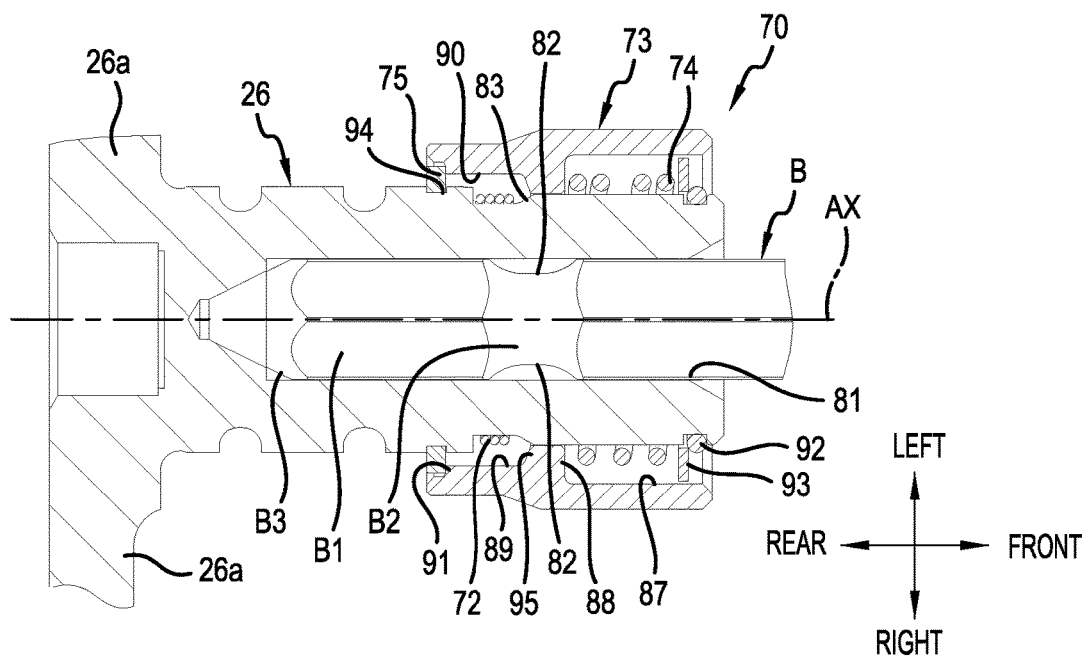
FIG. 5 is a cross-sectional view taken along line V-V in FIG. 4.
Figure 6:
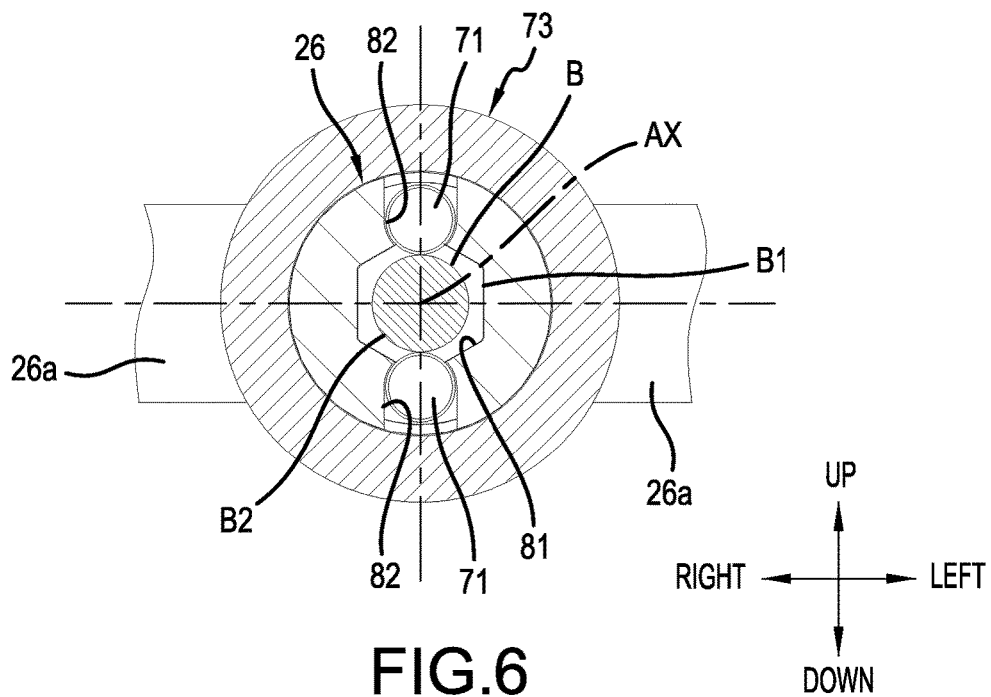
FIG. 6 is a cross-sectional view taken along line VI-VI in FIG. 4.
Figure 7:
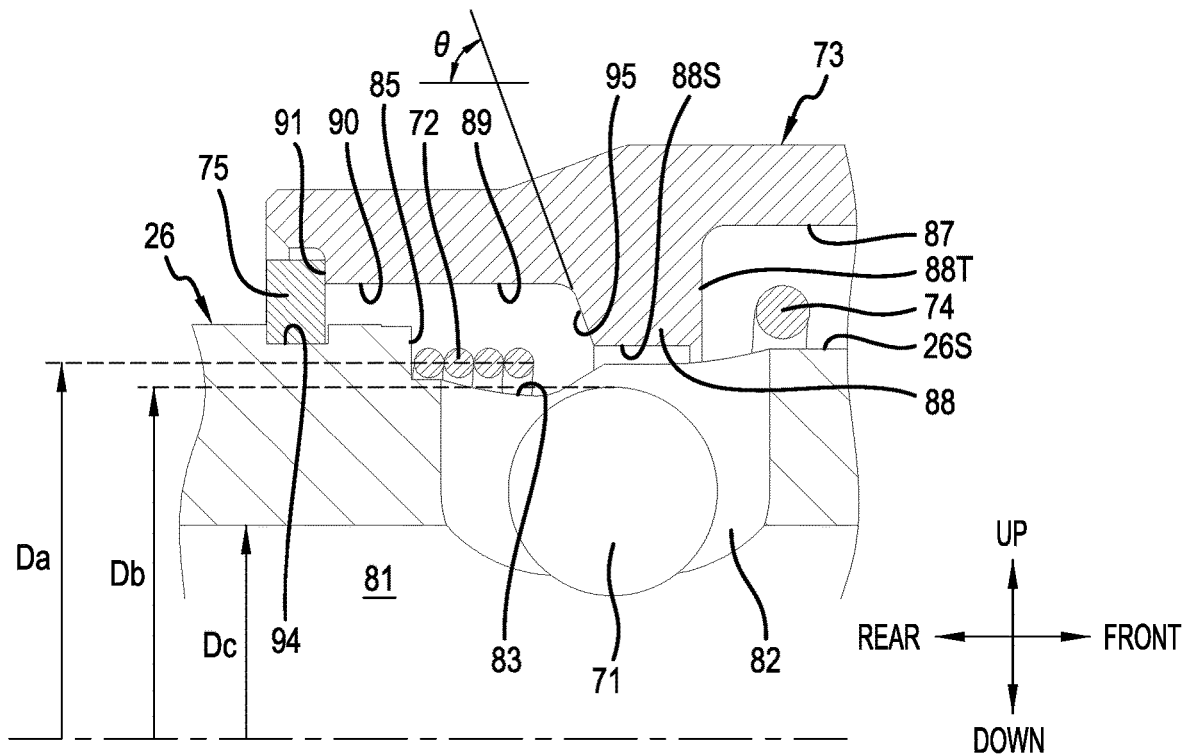
FIG. 7 is an enlarged view for explaining a tilted surface of a bit sleeve according to the exemplary embodiment.
Figure 8:
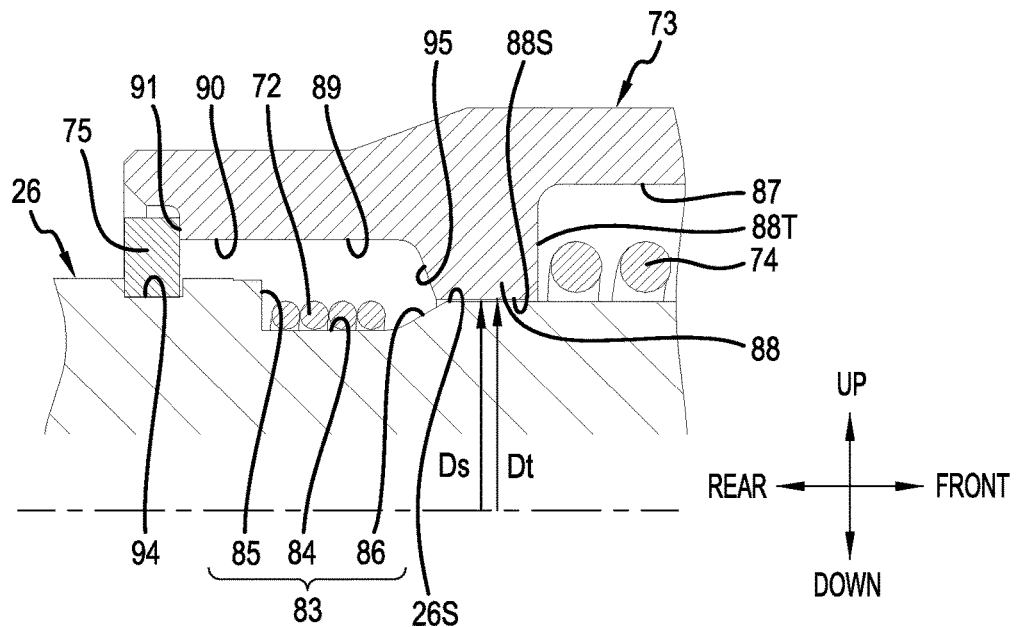
FIG. 8 is an enlarged view for explaining a tapered portion of an anvil according to the exemplary embodiment.

FIG. 4 is a longitudinal, cross-sectional view that shows the tool-holding apparatus 70 according to the present embodiment in greater detail; FIG. 5 is a cross-sectional view taken along line V-V in FIG. 4; FIG. 6 is a cross-sectional view taken along line VI-VI in FIG. 4; FIG. 7 is an enlarged view for explaining a tilted surface 95 of a bit sleeve (tool sleeve) 73 according to the present embodiment; and FIG. 8 is an enlarged view for explaining a tapered portion 86 of the anvil 26 according to the present embodiment.

As shown in FIGS. 4-6, the tool-holding apparatus 70 comprises the anvil 26 (rotational-output shaft), two balls 71 (engaging members), a first coil spring 72 (first biasing member), the bit sleeve 73, a second coil spring 74 (second biasing member), and a retaining ring 75 (axial positioning part; hereinafter simply "positioning part").

The bit B comprises: a mounting portion B1, which has a hexagonal-column shape; a circumferential groove B2, which is provided on the mounting portion B1; a tapered portion B3, which is provided on a rear-end portion of the mounting portion B1; and a fabricated portion (not shown), which is provided on a front-end portion of the mounting portion B1. The fabricated portion serves as the functional portion of the bit B and may provide a screwdriver head, a drill head, a socket, etc. The mounting portion B1 has a rearward mounting portion and a forward mounting portion that are separated by the circumferential groove B2. The rearward mounting portion between the tapered portion B3 and the circumferential groove B2, and the forward mounting portion is between the circumferential groove B2 and the fabricated portion. The portion of the bit B that comprises the rearward mounting portion (B1), the circumferential groove B2 and the forward mounting portion (B1) may also be referred to as a shaft, a mounting shaft or a bit shaft.

As was noted above, the anvil 26 includes the pair of extension parts 26a, which extend outward in the radial direction. The extension parts 26a are provided on the rear-end portion of the anvil 26. In addition, the anvil 26 has the insertion hole 81 (hole), into which the bit B is inserted. The insertion hole 81 is provided in the front-end portion of the anvil 26 and extends in the axial direction. The front-end portion of the insertion hole 81 is connected to the opening provided in the front-end portion of the anvil 26. The rear-end portion of the insertion hole 81 is closed up. The bit B is inserted into the insertion hole 81 from the forward side of the insertion hole 81.

The insertion hole 81 has a hexagonal-section shape in transverse cross section that matches (is complementary to) the mounting portion B1 of the hexagonal-column-shaped bit B. Two slotted holes 82 (obround holes) are formed in an intermediate portion of the anvil 26 in the axial direction. Each slotted hole 82 is elongated in the axial direction. In addition, the slotted holes 82 are formed such they extend outward in the radial direction from the insertion hole 81. Radially-inward edges of the slotted holes 82 communicate or are contiguous with the insertion hole 81, whereas radially-outward edges of the slotted holes 82 are open. The slotted holes 82 are provided equispaced in the circumferential direction and are disposed at two of the corners the hexagonal inner surface of the insertion hole 81. In plan view, the slotted holes 82 have two semicircular end portions that are connected by two parallel straight edges. At the radially-outward edge of the slotted holes 82, the width of the slotted holes 82 in the circumferential direction of the anvil 26 is slightly greater than the diameter of the ball 71 disposed in the slotted hole 82. For example, the width of the slotted holes 82 at the radially-outward edges is preferably 1-10% greater than the diameter of the balls 71. Consequently, movement of the balls 71 in the circumferential direction of the anvil 26 is constrained by the relatively narrow gap between the parallel straight edges of the slotted holes 82. On the other hand, at the radially-outward edges of the slotted holes 82, the length of the slotted holes 82 in the axial direction of the anvil 26 is at least 25% greater than the diameter of the balls 71 so that the balls 71 can roll in the axial direction relative to the anvil 26. Preferably, the length of the slotted holes 82 at the radially-outward edges is 25-100% (i.e. 1.25-2 times) greater than the diameter of the balls 71. In the radial direction of the slotted holes 82, at least the width of the slotted holes 81 narrows close to the radially-inward edge of the slotted holes 82, as can be seen in FIG. 6, so that the balls 71 do not fall into the insertion hole 81 when no bit B is inserted into the insertion hole 81. However, a sufficient amount of the ball 71 must be able to protrude radially inwardly so that a portion of the ball 71 can engage in the circumferential groove B2 of the bit B, to hold the bit B in the insertion hole 81. Therefore, the width of the slotted holes 82 at the radially-inward edges is preferably 10-30% less than the diameter of the balls 71. At the radially-inward edges of the slotted holes 82, the length of the slotted holes 82 in the axial direction of the anvil 26 is about the same or slightly less than the length of the slotted holes 82 at the radially-outward edges of the slotted holes 82.

One ball 71 is disposed in each of the slotted holes 82. As was explained above, the balls 71 are supported in the slotted holes 82 of the anvil 26, such that the balls 71 are movable in the axial direction and the radial direction, but are not significantly movable in the circumferential direction.

The first coil spring 72 (first elastic body) biases the balls 71 in the direction (i.e. in the axially forward direction) that is reverse of the insertion direction of the bit B and in the direction (i.e. in the radially inward direction) in which the balls 71 engage with the bit B.

FIG. 7 shows the bit sleeve 73 and the anvil 26 in the state in which the bit B is not inserted in the insertion hole 81. As shown in FIG. 7, the winding diameter Da of the first coil spring 72 is larger than inner diameter Dc of the insertion hole 81 of the bit B and is less than the diameter of the portion of the outer-circumferential surface of the anvil 26 that is forward and rearward (i.e. outer-circumferential surface 26S, as will be explained below) of the circumferential groove 83 (see below), in which the first coil spring 72 is disposed. In addition, as shown in FIG. 7, when the bit B is not inserted into the insertion hole 81 and both of the balls 71 are disposed at their radially-inward-most positions, the winding diameter Da of the first coil spring 72 is substantially equal to or larger than the distance Db between the radially-outermost edge of one of the balls 71 and the radially-outermost edge of the other ball 71.

The first coil spring 72 is wound, for example, four times with the winding diameter Da described above. The first coil spring 72 has a circular-pipe (hollow cylindrical) shape and is preferably designed as a compression spring.

As shown in FIG. 8, the anvil 26 has the above-mentioned circumferential groove 83 (third recess), which is defined inward of the outer-circumferential surface of the anvil 26. The first coil spring 72 is received (held) in the circumferential groove 83. More specifically, the circumferential groove 83 has: a bottom 84, whose diameter is smaller than the diameter of the outer-circumferential surface of the anvil 26; a wall 85, which is provided on one side of the bottom 84 in the axial direction and which contacts one end of the first coil spring 72; and a tapered portion 86, which is provided on the other side of the bottom 84 in the axial direction and is connected to (contiguous with) the outer-circumferential surface of the anvil 26. As shown in FIG. 7, a rear-end portion of the first coil spring 72 is disposed such that it contacts the wall 85 of the anvil 26.

As was noted above, the diameter of the bottom 84 is smaller than the diameter of the outer-circumferential surface of the anvil 26. The depth of the bottom 84 is uniform in both the circumferential direction and the axial direction. The wall 85 is provided rearward of the bottom 84 such that it is orthogonal to a line parallel to rotational axis AX, i.e. the wall 85 extends radially outward from the axially rearward edge of the bottom 84. The wall 85 is continuous in the circumferential direction. The tapered portion 86 is provided forward of the bottom 84 and smoothly (continuously, e.g., monotonically) connects to the bottom 84. The tapered portion 86 also smoothly (continuously, e.g., monotonically) connects to the outer-circumferential portion of the anvil 26. In a cross section that includes the rotational axis AX, the boundary between the tapered portion 86 and the bottom 84 has a curved shape, and the boundary between the tapered portion 86 and the outer-circumferential portion of the anvil 26 has a curved shape. However, in a cross section that includes the rotational axis AX, the tapered portion 86 may instead have a straight-line shape or may have a curved shape that is recessed in alternate embodiments of the present teachings.

The first coil spring 72 is disposed on the inner side of the circumferential groove 83. As was noted above, the rear end of the first coil spring 72 in the axial direction makes contact with the wall 85 of the anvil 26. The front end of the first coil spring 72 in the axial direction makes contact with the balls 71.

As shown in FIGS. 4-8, the bit sleeve 73 has a circular-tube (generally hollow cylindrical) shape and is disposed on (around) the outer-circumferential surface of the anvil 26. The bit sleeve 73 is disposed outward in the radial direction of the balls 71, i.e. radially outward of the balls 71. The bit sleeve 73 is movable in the axial direction relative to the outer-circumferential surface of the anvil 26.

On its inner circumferential surface, the bit sleeve 73 has a first circumferential groove 87, a projection 88, a second circumferential groove 89 (first recess), a third circumferential groove 90 (second recess), and a step 91. The first circumferential groove 87 is provided axially forward of the projection 88. The second circumferential groove 89 is provided axially rearward of the projection 88. The third circumferential groove 90 is provided axially rearward of the second circumferential groove 89. The step 91 is provided axially rearward of the third circumferential groove 90.

The second circumferential groove 89 and the third circumferential groove 90 are provided on a rear portion of the bit sleeve 73 and are continuous (contiguous) in the axial direction. Although the inner diameter of the second circumferential groove 89 is equal to the inner diameter of the second circumferential groove 90 in the present embodiment and thus form a single uniform groove (recess), it is noted that the inner diameters of the second and third circumferential grooves 89, 90 may differ from one another in alternate embodiments of the present teachings. The third circumferential groove 90 is open in the axial direction and the step 91 is formed at the axially rearward end of the third circumferential groove 90. The second circumferential groove 89 permits movement of the balls 71 outward in the radial direction. That is, the portion of the bit sleeve 73 rearward of the projection 88 permits movement of the balls 71 outward in the radial direction, i.e. radially outward. The third circumferential groove 90 communicates with the second circumferential groove 89 and houses the first coil spring 72 in the compressed state. That is, the third circumferential groove 90 permits a radially outward expansion of the axially front end of the first coil spring 72 when it is compressed in its axial direction, as will be further explained below.

The projection 88 is disposed on the forward side of the first coil spring 72 and extends inward in the radial direction from an inner-circumferential portion of the bit sleeve 73. The projection 88 has a ring shape and is designed to contact the anvil 26 and/or the balls 71 depending on the position of the bit sleeve 73 relative to the anvil 26 in the axial direction.

As shown in FIGS. 7 and 8, the projection 88 has a contacting, inner-circumferential surface 88S, which is designed to contact a contacting, outer-circumferential surface 26S of the anvil 26. The inner diameter Dt of the projection 88 at the contacting, inner-circumferential surface 88S is slightly larger than the outer diameter Ds of the anvil 26 along the contacting, outer-circumferential surface 26S. The contacting, inner-circumferential surface 88S of the projection 88 slidably contacts the contacting, outer-circumferential surface 26S of the anvil 26 when the bit sleeve 73 is axially moved (e.g., manually pulled) relative to the anvil 26. More specifically, the contacting, outer-circumferential surface 26S of the anvil 26 guides axial movement of the contacting, inner-circumferential surface 88S of the projection 88 when the bit sleeve 73 moves in the front-rear direction relative to the anvil 26. In addition, the contacting, inner-circumferential surface 88S functions as a sliding-contact part (bearing part, i.e. a plain bearing or journal) that positions the bit sleeve 73 with respect to the anvil 26 in the radial direction. Thus, the contacting, inner-circumferential surface 88S may also be called a radial positioning part. The contacting, inner-circumferential surface 88S, which functions as the sliding-contact part (bearing part), is located on the axially forward side of the first coil spring 72 and is disposed on the axially rearward side of the second coil spring 74. Because the contacting, inner-circumferential surface 88S, which functions as the sliding-contact part (bearing part), is disposed at an intermediate position of the bit sleeve 73 in the front-rear direction, it provides a superior positioning function in the radial direction as compared to embodiments, in which the sliding-contact part is disposed along the rear-end portion of the bit sleeve, such as was disclosed in the above-described Japanese Patent No. 3652918.

The second coil spring 74 (second elastic body) is disposed around the outer-circumferential surface of the anvil 26 and extends in parallel with the first circumferential groove 87 of the bit sleeve 73. The second coil spring 74 biases the bit sleeve 73 rearward. The rearward end of the second coil spring 74 contact a radially-extending wall surface 88T of the projection 88. The frontward end of the second coil spring 74 contacts a radially-extending stopper (stop) 93, which is fixed on the anvil 26. Consequently, the bit sleeve 73 is biased, by the biasing force of the second coil spring 74, toward the rearward end of the anvil 26.

As can be seen in FIGS. 4-5, the stopper 93 is mounted on the outer-circumferential surface of the anvil 26 near the front end of the anvil 26, and is held (fixed) in position by a retaining ring 92. The stopper 93 has a ring shape when viewed in the front-rear direction. The first circumferential groove 87 of the bit sleeve 73 slidably contacts the radially outer surface of the stopper 93, such that the stopper 93 also guides axial movement of the bit sleeve 73 relative to the anvil 26.

Rearward of the stopper 93 and rearward of the insertion hole 81, a circumferentially-extending groove 94 is formed in the outer-circumferential surface of the anvil 26. The retaining ring 75 is disposed in the groove 94 and is fixed to (held on) the outer-circumferential surface of the anvil 26. The retaining ring 75 is, for example, a circlip or a snap ring. The step 91 of the bit sleeve 73 is provided on (at) an end portion of an inner-circumferential surface of the bit sleeve 73 in the axial direction. The step 91 is configured (designed) to make contact with the retaining ring 75 such that the step 91 radially surrounds (covers) the retaining ring 75 when the bit sleeve 73 contacts the retaining ring 75.

The bit sleeve 73 is movable in the axial (front-rear) direction relative to the anvil 26 between: a blocking position, at which movement of the balls 71 outward in the radial direction is blocked (see e.g., FIG. 4 or FIG. 9); and a permitting position, at which movement of the balls 71 outward in the radial direction is permitted (see e.g., FIG. 15, which will be discussed below). At the blocking position, the projection 88 is located outward in the radial direction of the balls 71, i.e. the projection 88 radially surrounds the balls 71. On the other hand, at the permitting position, the projection 88 is located more towards the front-end portion of the anvil 26 such that the projection 88 is not outward in the radial direction of the balls 71, i.e. the projection 88 does not radially surrounds the balls 71. Instead, at the permitting position, the second circumferential groove 89 and/or the third circumferential groove 90 is (are) located outward in the radial direction of the balls 71, i.e. the second circumferential groove 89 and/or the third circumferential groove 90 radially surround(s) the balls 71.

As was mentioned above, the bit sleeve 73 is biased, by the biasing force of the second coil spring 74, toward the rearward end of the anvil 26. i.e. towards the blocking position. For example, when the step 91 makes contact with the retaining ring 75, the bit sleeve 73 is positioned at the blocking position, although the projection 88 may still block the radially-outward movement of the balls 71 even if the step 91 is slightly spaced apart from the retaining ring 75.

The retaining ring 75 positions (stops) the bit sleeve 73, which is being urged rearwardly in the axial direction, at the blocking position. That is, the bit sleeve 73 is biased toward and is thereby positioned (stopped) at the blocking position, owing to the step 91 making contact with the retaining ring 75.

As can been seen, e.g., in FIG. 7, the bit sleeve 73 has a tilted surface 95, which is provided on the inner-circumferential surface of the bit sleeve 73 between the projection 88 and the second circumferential groove 89 in the axial direction. The tilted surface 95 is tilted outward in the radial direction from the projection 88 toward the second circumferential groove 89 at an angle θ of the tilted surface 95 with respect to a line parallel to rotational axis AX of the anvil 26 within a range of 45° or greater and 90° or less, i.e. 45°≤θ≤90°. As will discussed further below with regard to FIGS. 12 and 13, when the balls 71 are caused to move outward in the radial direction and press against the tilted surface 95, the bit sleeve 73 is caused to move axially forward against the biasing force of the second coil spring 74.

Operation of Tool-Holding Apparatus 70

FIG. 9 to FIG. 15 are cross-sectional views that respectively show the movements of the components of the tool-holding apparatus 70 while the bit B is being mounted in the tool-holding apparatus 70 according to the present embodiment, and FIG. 16 to FIG. 19 are cross-sectional views that each show the movements of the components of the tool-holding apparatus 70 while the bit B is being demounted (removed, withdrawn) from the tool-holding apparatus 70 according to the present embodiment.

First, the movements while the bit B is being inserted into the insertion hole 81 without manual manipulation of the bit sleeve 73 will be explained, with reference to FIG. 9 to FIG. 14.

Figure 9:
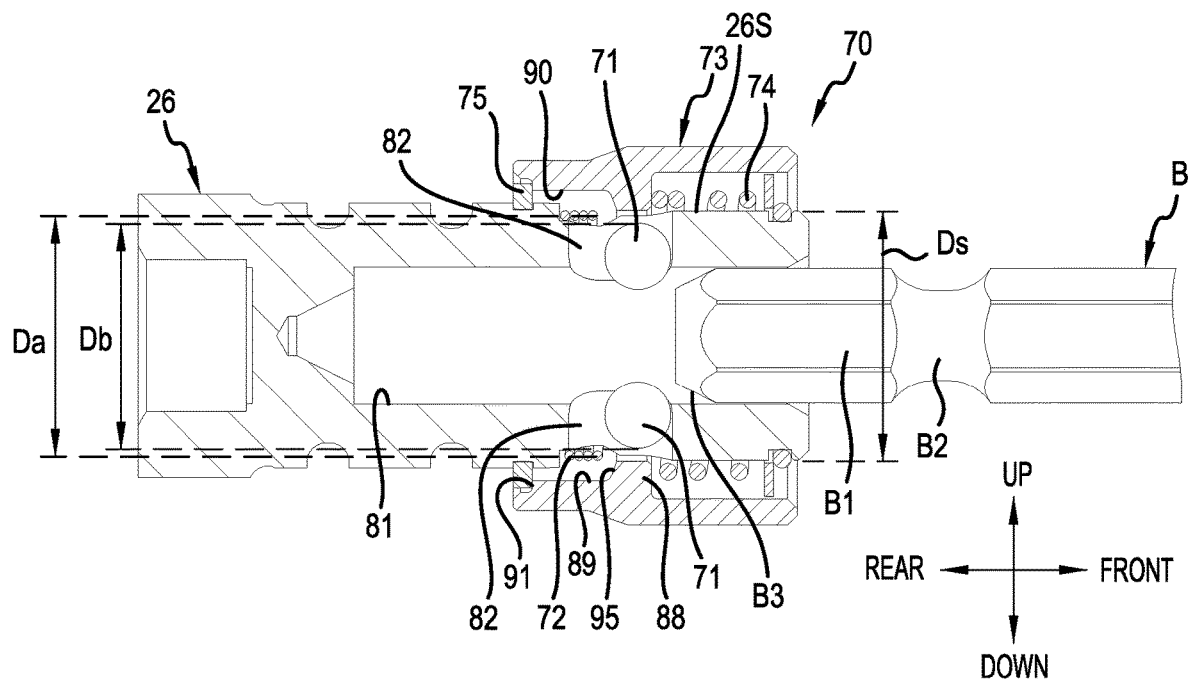
FIG. 9 is a cross-sectional view that shows a first stage of movements when a bit is being mounted in the tool-holding apparatus according to the present embodiment while the bit sleeve is located at its rearward-most position relative to a rotational-output shaft.

As shown in FIG. 9, prior to the bit B being mounted in (on) the tool-holding apparatus 70, the bit sleeve 73 is biased toward the rear-end-portion side (rearward side) of the anvil 26 by the biasing force of the second coil spring 74 such that the bit sleeve 73 is positioned (stopped) at the blocking position where the step 91 makes contact with the retaining ring 75. At this time, because the projection 88 of the bit sleeve 73 is disposed outward in the radial direction of the balls 71, movement of the balls 71 outward in the radial direction is blocked.

In addition, as described above, prior to the bit B being inserted into the insertion hole 81, the winding diameter Da of the first coil spring 72 is substantially equal to or greater than distance Db between the radially outermost edge of one of the balls 71 and the radially outermost edge of the other ball 71 (when the balls 71 are both disposed at their radially inner-most positions).

Figure 10:
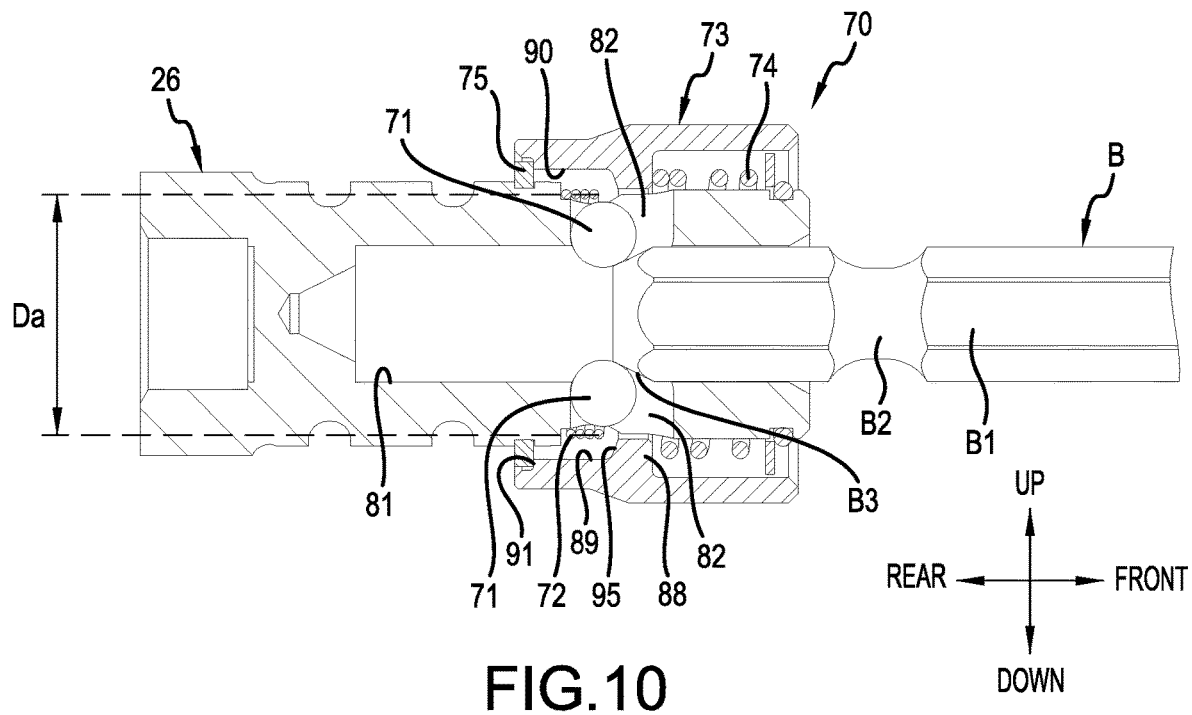
FIG. 10 is a cross-sectional view that shows a second stage of movements when the bit is being mounted in the tool-holding apparatus according to the exemplary embodiment.
Figure 11:
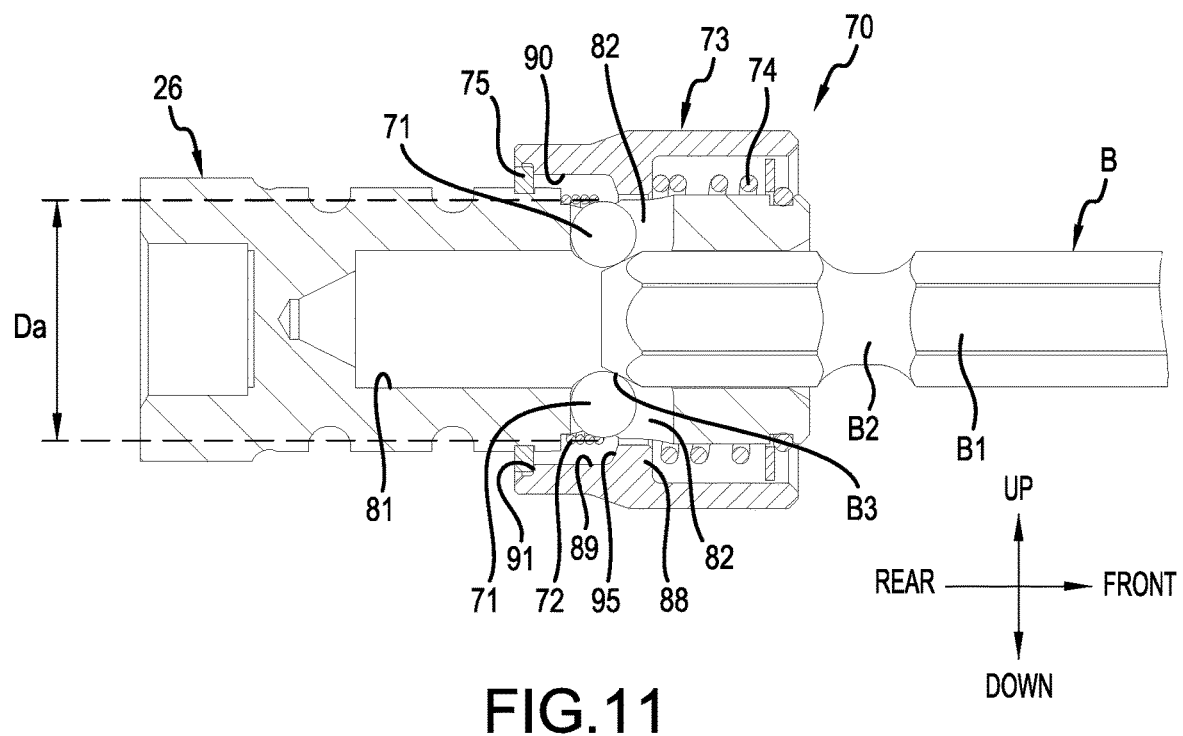
FIG. 11 is a cross-sectional view that shows a third stage of movements when the bit is being mounted on the tool-holding apparatus according to the exemplary embodiment.
Figure 12:
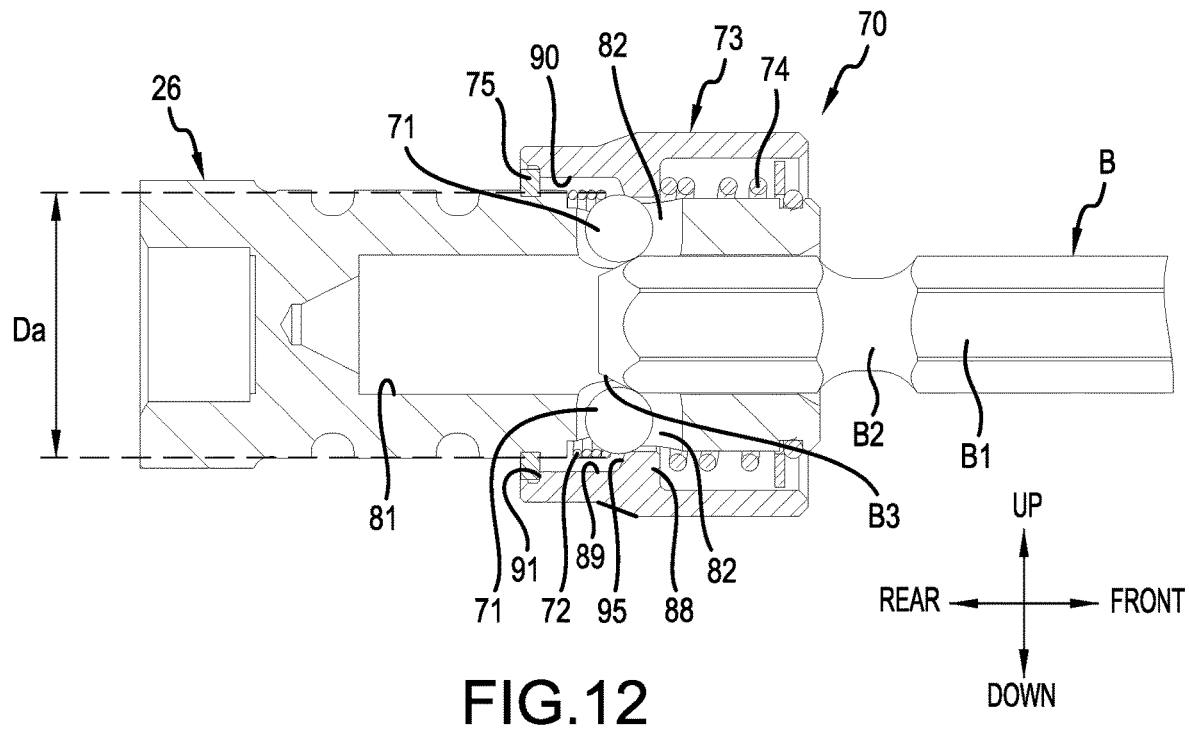
FIG. 12 is a cross-sectional view that shows a fourth stage of movements when the bit is being mounted in the tool-holding apparatus according to the exemplary embodiment.
Figure 13:
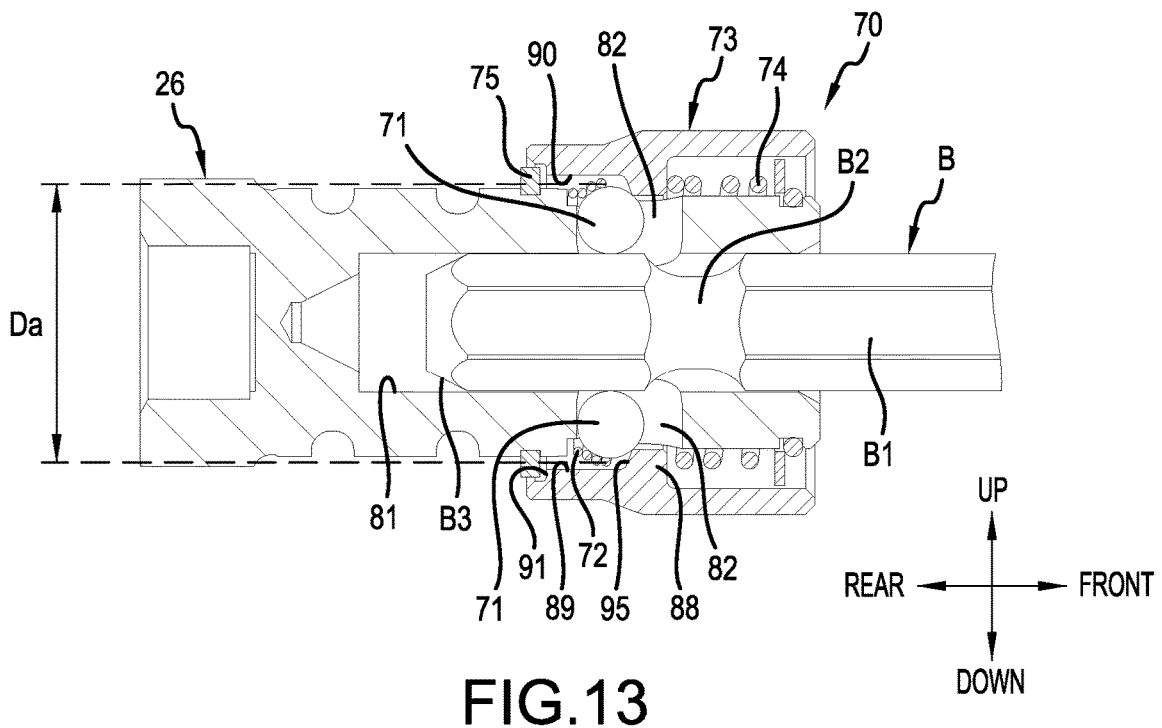
FIG. 13 is a cross-sectional view that shows a fifth stage of movements when the bit is being mounted in the tool-holding apparatus according to the exemplary embodiment.
Figure 14:
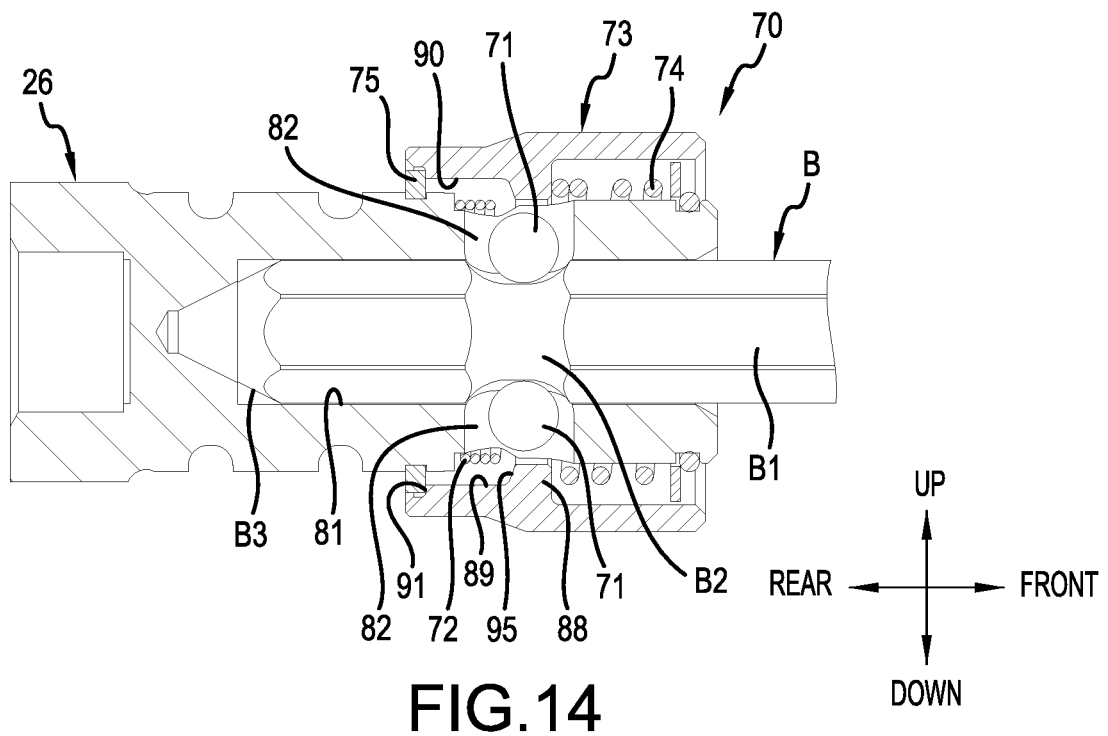
FIG. 14 is a cross-sectional view that shows a sixth stage of movements when the bit is being mounted in the tool-holding apparatus according to the exemplary embodiment.

In this state, the base-end portion (i.e. opposite of the fabricated portion having the screwdriver, socket, etc., formed thereon) of the bit B is inserted into the insertion hole 81 of the bit sleeve 73. Then, as shown in FIG. 10, the tapered portion B3 of the bit B contacts the balls 71 and pushes in the balls 71 in the insertion direction (i.e. in the axially rearward direction) along the parallel, axially-extending (straight) inner sides of the slotted holes 82. When the bit B is pressed farther into the insertion hole 81 of the bit sleeve 73, the balls 71 contact and press against the first coil spring 72 as shown in FIG. 11. Subsequently, as shown in FIG. 12, when further pressing of the bit B into the insertion hole 81 causes the tapered portion B3 to move the balls 71 outward in the radial direction, the first coil spring 72 deforms owing to its contact with the balls 71. More specifically, the balls 71 compress the first coil spring 72 in the axial direction while expanding the diameter of the first coil spring 72 in the radial direction. The first coil spring 72 is thereby caused to deform such that the axially forward portion of the first coil spring 72 moves (widens) outward in the radial direction. In so doing, as shown in FIG. 13, the segment of the mounting portion B1 of the bit sleeve 73 between the tapered portion B3 and the circumferential groove B2 moves to a location at which that segment opposes the projection 88, i.e. the projection 88 radially surrounds at least a portion of the segment of the mounting portion B1 between the tapered portion B3 and the circumferential groove B2. In addition, because the balls 71 are now moving outward in the radial direction, the balls 71 contact and press against the tilted surface 95 that is adjacent to the projection 88, whereby the bit sleeve 73 moves towards the tip-portion side (forward side) of the anvil 26. That is, the bit sleeve 73 automatically moves (i.e. without manual manipulation) axially forward relative to the anvil 26 such that the step 91 becomes spaced apart from the retaining ring 75, as can be seen in FIG. 13. Furthermore, when the bit B is pressed farther into the insertion hole 81 of the anvil 26, the circumferential groove B2 then moves to an axial location at which it opposes the balls 71 in the radial direction as shown in FIG. 14. Owing to the biasing force of the first coil spring 72, which acts both axially and radially inward, the balls 71 are caused to move along the inner sides of the slotted holes 82 toward the tip-portion side (forward side) of the anvil 26 (i.e. in the axially forward direction relative to the anvil 26) and then engage in (fall or drop into) the circumferential groove B. Therefore, the projection 88 now radially surrounds both the balls 71 and the circumferential groove B2 such that radially outward movement of the balls 71 is blocked, thereby fixedly retaining the bit B in the insertion hole 81.

Thus, because the first coil spring 72 deforms owing to its contact with the balls 71, the winding diameter Da of at least the axially forward portion of the first coil spring 72 increases, whereas the winding diameter Da of the axially rearward portion of the first coil spring 72 does not increase or only slightly increases, but less than the height of the wall 85 so that the axially rearward portion of the coil spring 72 always remains in contact with the wall 85. That is, the winding diameter Da of at least the axially forward portion of the first coil spring 72 in the state shown in FIG. 12 is greater than the winding diameter Da of the axially forward portion of the first coil spring 72 in the state shown in FIG. 11. The winding diameter Da of the axially forward portion of the first coil spring 72 in the state shown in FIG. 13 is greater than the winding diameter Da of the axially forward portion of the first coil spring 72 in the state shown in FIG. 12. Owing to the biasing force of the first coil spring 72 that is applied to the balls 71 in the radially-inward direction and the axially-forward direction during the insertion of the bit B, the motion of the balls 71 is stabilized during the bit insertion procedure. On the other hand, if the winding diameter of the coil spring (34) were to instead be smaller than the distance between the radially outermost-edges of the balls 71, e.g., in the tool-holding apparatus of the above-described Japanese Patent No. 3652918, it is expected that the motion of the balls during insertion of the bit would be unstable.

In the state shown in FIG. 12, the balls 71 contact the tilted surface 95 of the bit sleeve 73. This contact will cause the user to experience a click sensation. In this state, when the bit B is further inserted, the biasing forces of the first coil spring 72 and the second coil spring 74 apply some resistance even though the tapered portion B3 of the bit B kicks up the balls 71. Consequently, the user can experience an insertion sensation indicating that he or she is inserting the bit B. Furthermore, when the state shown in FIG. 13 is reached, movement between the balls 71 and the outer-circumferential surface of the mounting portion B1 of the bit B is only frictional movement, and therefore the bit B can continue to be inserted without any significant feeling of resistance.

Subsequently, as shown in FIG. 14, the balls 71 automatically enter into the circumferential groove B2 owing to the biasing force of the first coil spring 72. Thus, when the bit B is inserted into the insertion hole 81 without manual manipulation of the bit sleeve 73, the first coil spring 72 deforms, and therefore the balls 71 automatically fall into the circumferential groove B2 (recess) of the bit B. When the balls 71 automatically enter (drop) into the circumferential groove B2, the winding diameter Da of the first coil spring 72 becomes smaller, whereby the first coil spring 72 can energetically (actively) move the balls 71 into the circumferential groove B2. As a result, when the balls 71 collide with the inner surface of the circumferential groove B2, a sound is generated, which informs the user that the bit B has been securely fixed to the anvil 26. On the other hand, if the winding diameter of the coil spring (34) were to instead be smaller than the distance between the radially outermost-edges of the balls 71, e.g., in the tool-holding apparatus of the above-described Japanese Patent No. 3652918, it is likely that the biasing force of the coil spring (34) would be too weak to generate a sound when the balls contact the inner surface of the circumferential groove of the bit.

When the balls 71 enter (drop, fall) into the circumferential groove B2, the bit sleeve 73 automatically moves axially rearward toward the rear-end-portion side (rearward side) of the anvil 26 owing to the biasing force of the second coil spring 74 and again stops at the blocking position where the step 91 makes contact with the retaining ring 75. In addition, because the projection 88 of the bit sleeve 73 is disposed outward in the radial direction of the balls 71, movement of the balls 71 outward in the radial direction is blocked. Consequently, the bit B is securely held by the anvil 26 via the balls 71 and the projection 88.

It is noted that, in the explanation described above, the bit sleeve 73 is biased by the biasing force of the second coil spring 74 so that the step 91 makes contact with the retaining ring 75 at the blocking position. However, the bit B can be held on the anvil 26 by another securing technique.

Figure 15:
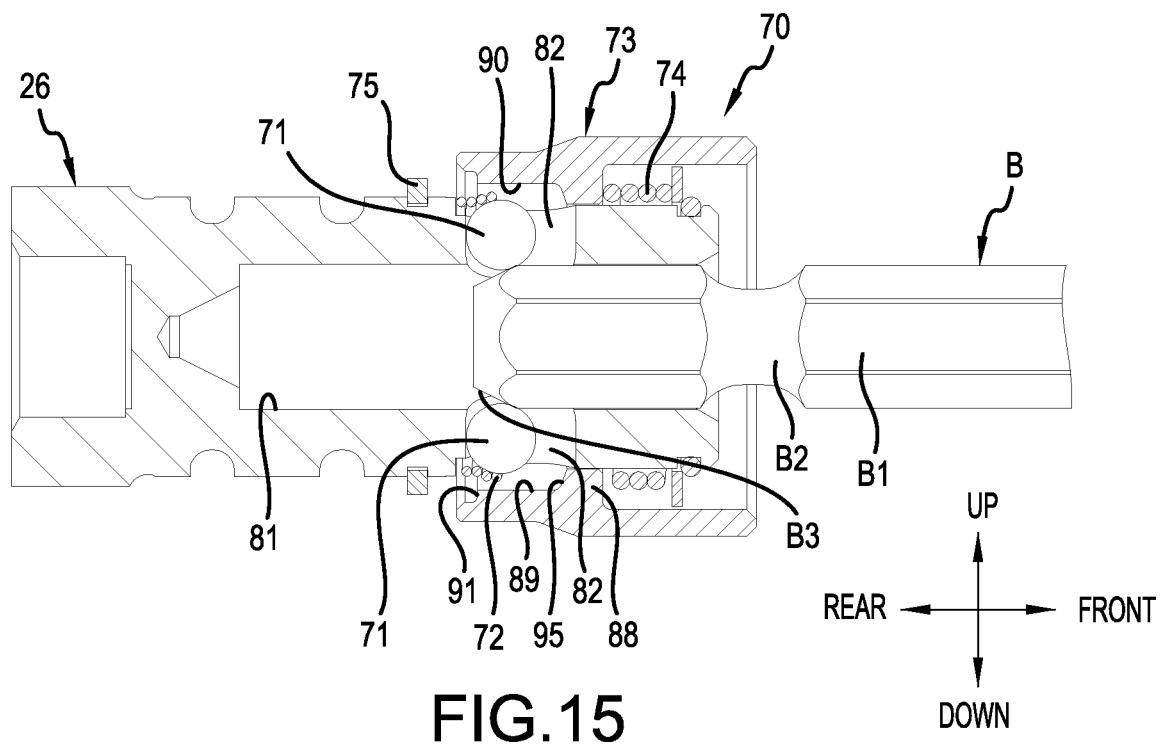
FIG. 15 is a cross-sectional view that an intermediate stage of movements when the bit is being mounted in the tool-holding apparatus according to the exemplary embodiment while the bit sleeve has been pulled forward relative to the rotational-output shaft.

Next, a description of the movements of the components of the tool-holding apparatus 70 while the bit B is being inserted into the insertion hole 81 in the state in which the bit sleeve 73 has been manually manipulated such that bit sleeve 73 is moved forward relative to the anvil 26 will be provided, with reference to FIG. 15.

As shown in FIG. 15, the bit sleeve 73 has been manually manipulated (pulled) by the user such that the bit sleeve 73 has moved, relative to the anvil 26 and against the biasing force of the second coil spring 74, toward the tip-portion side (forward side) of the anvil 26. Therefore, in FIG. 15, the step 91 is spaced apart from the retaining ring 75 and the bit sleeve 73 is held at the permitting position. At this time, the projection 88 has been moved axially forward so as to mostly surround the outer circumferential surface of the anvil 26 forward of the slotted holes 82 so that the projection 88 is not located outward in the radial direction of the balls 71. That is, now the second and/or third circumferential groove 89, 90 is located outward in the radial direction of the balls 71.

In this state, when the base-end portion of the bit B is inserted into the insertion hole 81 of the anvil 26, the tapered portion B3 of the bit B contacts and pushes in the balls 71 and thereby causes the balls 71 to move forward in the insertion direction (i.e. in the axially rearward direction) along the inner sides of the slotted holes 82. In so doing, the balls 71 also move outward in the radial direction, and the first coil spring 72 deforms due to its contact with the balls 71. Therefore, similar to the above-described operation (movements) when the bit sleeve 73 has not been pulled (manually manipulated) forward relative to the anvil 26, the balls 71 compress the first coil spring 72 in the axial direction while expanding the diameter of the first coil spring 72 in the radial direction. Therefore, the first coil spring 72 deforms such that an axially-forward portion of the first coil spring 72 moves outward in the radial direction. The compressed, radially-widened first coil spring 72 therefore enters (moves radially outward) into the circumferential groove 90. Consequently, when the bit B is pushed farther into the insertion hole 81 of the anvil 26, the mounting portion B1 can pass through without being obstructed by the balls 71, because the balls 71 can move radially outward against the radially-inward biasing force of the compressed, radially-widened first coil spring 72. Subsequently the balls 71 are moved along the inner sides of the slotted holes 82 in the axial direction owing to the biasing force of the first coil spring 72 in the axially-forward direction and eventually engage in (drop into) the circumferential groove B2.

Thus, even in the state in which the bit sleeve 73 has been manually moved (pulled) forward relative to the anvil 26, the bit B can be smoothly and easily inserted into the insertion hole 81, because the first coil spring 72 deforms radially outward to allow the mounting portion B1 to pass by the balls 71, after which the balls 71 automatically fall into the circumferential groove B2 of the bit B, thereby securing the bit B in the insertion hole 81.

As described above, if the sliding-contact part (bearing part) were to be disposed on the rear-end portion of the anvil in the tool-holding apparatus of the above-described Japanese Patent No. 3652918, then there would be no room for movement of the spring and the balls outward in the radial direction. Consequently, in the state in which the bit sleeve has been moved forward, the bit would not be able to be inserted into the bit sleeve, thereby becoming adversely difficult to use.

Figure 16:
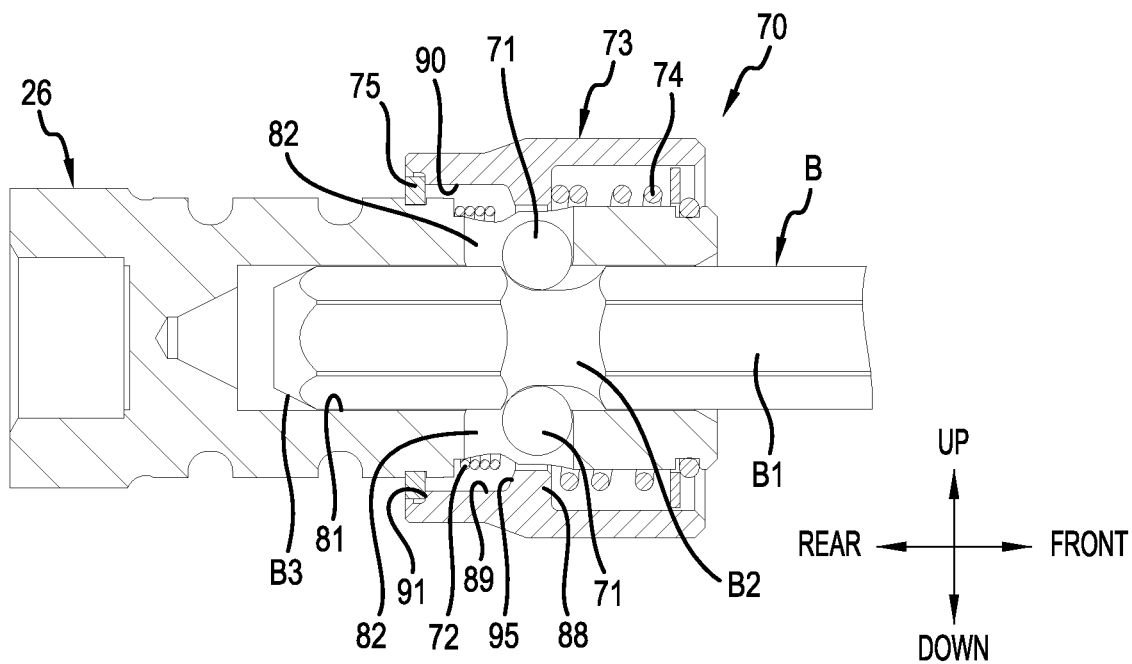
FIG. 16 is a cross-sectional view that shows a first stage of movements when the bit is being demounted (withdrawn, removed) from the tool-holding apparatus according to the exemplary embodiment while the bit sleeve is located at its rearward-most position relative to the rotational-output shaft.
Figure 17:
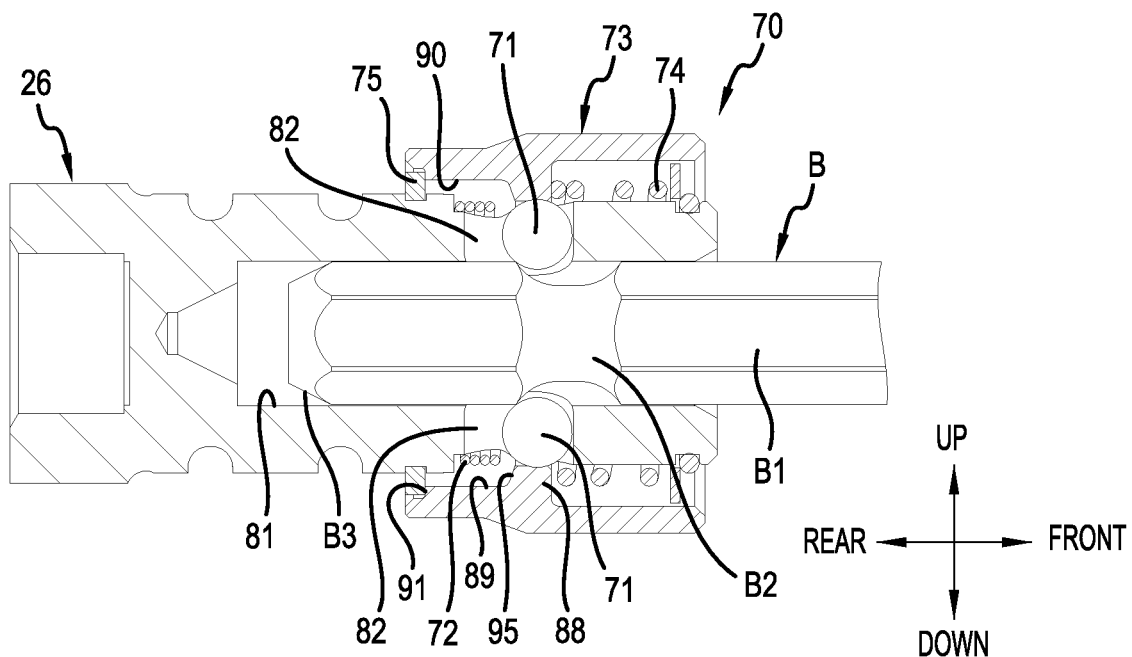
FIG. 17 is a cross-sectional view that shows a second stage of movements when the bit is being demounted from the tool-holding apparatus according to the exemplary embodiment.

Next, the movements of the components of the tool-holding apparatus 70 while the bit B is being demounted from the anvil 26 will be explained. As shown in FIG. 14, when the bit B is being held in the anvil 26, the bit sleeve 73 is stopped at the blocking position where the step 91 makes contact with the retaining ring 75 owing to the biasing force of the second coil spring 74, and the projection 88 is located outward in the radial direction of the balls 71 and blocks movement of the balls 71 outward in the radial direction. From this state, as shown in FIG. 16, the bit B is pulled, relative to the anvil 26, toward the tip-portion side of the anvil 26. In so doing, owing to the circumferential groove B2 of the bit B, the balls 71 move in the pull-out direction (in the axially forward direction) along the inner sides of the slotted holes 82. However, as shown in FIG. 17, because the projection 88 is located outward in the radial direction of the balls 71 and because the balls 71 cannot move outward in the radial direction owing to the projection 88, the bit B does not come out of the anvil 26. That is, the balls 71 block the removal of the bit B as long as the bit sleeve 73 is in the blocking position, i.e. where the step 91 contacts the retaining ring 75.

Figure 18:
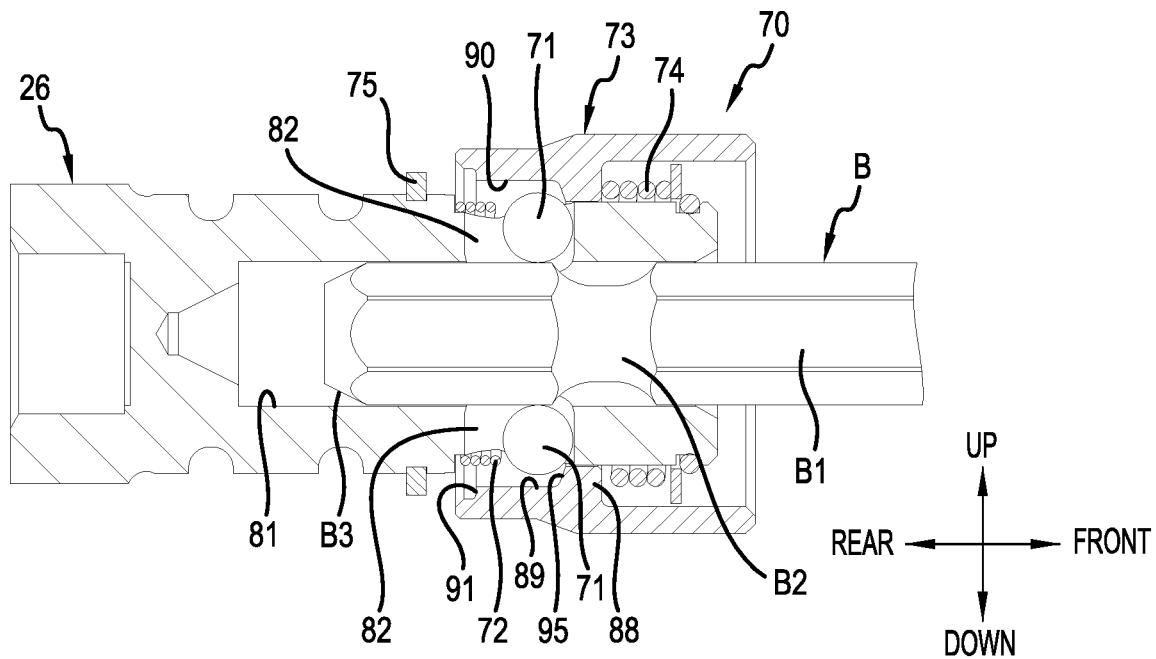
FIG. 18 is a cross-sectional view that shows a third stage of movements when the bit is being demounted from the tool-holding apparatus according to the exemplary embodiment while the bit sleeve has been pulled forward relative to the rotational-output shaft.
Figure 19:
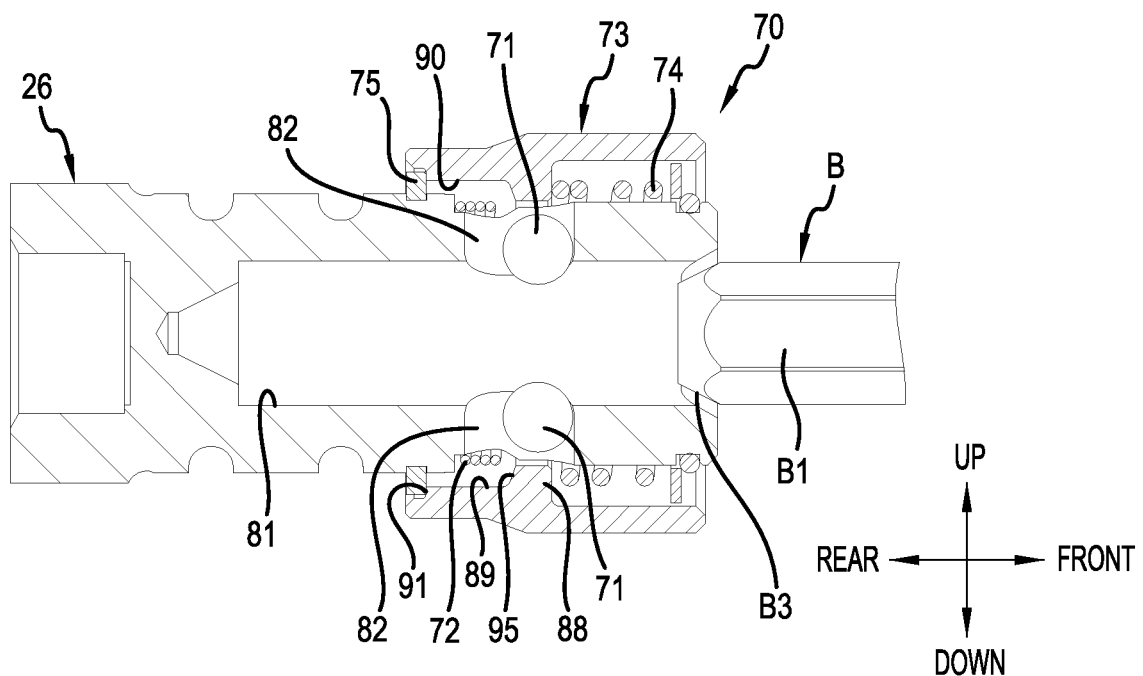
FIG. 19 is a cross-sectional view that shows a fourth stage of movements when the bit is being demounted from the tool-holding apparatus according to the exemplary embodiment in which the bit sleeve has returned its rearward-most position relative to the rotational-output shaft.

However, as shown in FIG. 18, when the operators grasps and moves (axially forward) the bit sleeve 73 relative to the anvil 26 toward the tip-portion side of the anvil 26 against the biasing force of the second coil spring 74, the projection 88 moves toward the front-end portion of the anvil 26 and thus no longer radially surrounds the balls 71. Instead, the second and/or the third circumferential groove 89, 90 is (are) now located outward in the radial direction of the balls 71. That is, one or both of the circumferential grooves 89, 90 radially surrounds the balls 71. In this state, when the bit B is pulled with respect to the anvil 26 toward the tip-portion side of the anvil 26, the balls 71 can move outward in the radial direction owing to the circumferential groove B2 and move into the second and/or third circumferential groove 89, 90. Consequently, as shown in FIG. 19, the bit B passes through without the mounting portion B1 being obstructed by the balls 71, and the bit B is demounted (removable) from the anvil 26.

Advantages and Effects of the Present Embodiment

As explained above, the present embodiment comprises, e.g.: the balls 71, which are supported so as to be movable in the axial direction and the radial direction in the anvil 26 having the insertion hole 81 into which the bit B is inserted and which balls 71 are engageable with the bit B; the first coil spring 72, which biases the balls 71 in the direction in which the balls 71 engage with the bit B; the bit sleeve 73, which is movable in the axial direction along the outer-circumferential surface of the anvil 26 and is axially movable between the blocking position at which movement of the balls 71 outward in the radial direction is blocked and the permitting position at which movement of the balls 71 outward in the radial direction is permitted; the second coil spring 74, which biases the bit sleeve 73 toward the blocking position; and the retaining ring 75, which is fixed on the outer-circumferential portion of the anvil 26 and positions (stops) the bit sleeve 73 at the blocking position. The bit sleeve 73 has the projection 88, which is disposed on the forward side of the first coil spring 72, extends inward in the radial direction, and is capable of contacting the anvil 26.

Because the contacting, inner-circumferential surface 88S of the projection 88 of the bit sleeve 73 contacts the contacting, outer-circumferential surface 26S of the anvil 26, the outer diameter Ds (refer to FIG. 8 and FIG. 9) of the anvil 26 at the contacting, outer-circumferential surface 26S can be made large. Consequently, the formation of cracks in the anvil 26 is curtailed, and the durability of the anvil 26 can be improved.

In addition, because the projection 88 of the bit sleeve 73 is capable of contacting the balls 71, the motion of the balls 71 can be stabilized during the operation of inserting the bit B into the insertion hole 81.

The step 91 is provided on (at) the end portion of the inner-circumferential portion of the bit sleeve 73 in the axial direction and is configured to make contact with the retaining ring 75. Because the step 91 is located on the inner-circumferential surface of the bit sleeve 73, the retaining ring 75 is hidden by the bit sleeve 73 and is not visible when the step 91 makes contact with and is positioned (stopped) at the retaining ring 75, thereby improving the overall appearance.

One end (rear end) of the first coil spring 72 in the axial direction makes contact with the anvil 26, and the other axial end (front end) makes contact with the balls 71. Therefore, because the biasing force of the first coil spring 72 is appropriately applied to the balls 71, stabilized motion of the balls 71 can be ensured during the insertion of the bit B into the insertion hole 81.

The tilted surface 95, which causes the bit sleeve 73 to move against the biasing force of the second coil spring 74 as a result of movement of the balls 71 outward in the radial direction toward the inner-circumferential surface of the bit sleeve 73, is provided, and the angle θ of the tilted surface 95 with respect to a line parallel to rotational axis AX is set to a range of 45° or greater and 90° or less. Because the angle θ of the tilted surface 95 is set to an appropriate angle, when the balls 71, which move outward in the radial direction, contact and press against the tilted surface 95, the bit sleeves 73 can be smoothly moved toward the permitting position using a relatively small force and the operation of mounting the bit B on the anvil 26 can be made smooth. Furthermore, because the user experiences a click sensation during bit insertion, ease of operation and ease of use can be improved.

The second circumferential groove 89, which permits movement of the balls 71 outward in the radial direction toward the inner-circumferential surface of the bit sleeve 73, is provided, and the third circumferential groove 90, which communicates with the circumferential groove 89 and accommodates the first coil spring 72 in the compressed and widened state, is provided. When the bit sleeve 73 is stopped, with respect to the anvil 26, at the permitting position against the biasing force of the second coil spring 74 and the bit B is inserted into the insertion hole 81 of the anvil 26, the tapered portion B3 of the bit B makes contact with and pushes against the balls 71. Therefore, the balls 71 compress the first coil spring 72 and move radially outwardly into the circumferential groove 90. Consequently, the bit B can be easily inserted into the insertion hole 81 without the bit B being obstructed by the balls 71, and thereby ease of operation can be improved.

The circumferential groove 83, which houses (supports) the first coil spring 72 disposed on the outer-circumferential surface of the anvil 26, is provided. The circumferential groove 83 includes: the bottom 84, whose diameter is smaller than that of the outer-circumferential surface; the wall 85, which is provided on one side of the bottom 84 in the axial direction and to (on) which the first coil spring 72 makes contact; and the tapered portion 86, which is provided on the other side of the bottom 84 in the axial direction and is smoothly continuous with the outer-circumferential surface of the anvil 26. Because the circumferential groove 83, which houses (supports) the first coil spring 72, is provided with the tapered portion 86, which is smoothly continuous with the outer-circumferential surface of the anvil 26, a concentration of stress on the circumferential groove 83 is reduced, and the durability of the anvil 26 thereby can be improved.

The impact driver 1 comprises, e.g.: the anvil 26, which has the insertion hole 81 (hexagonal hole); the balls 71, which are held in the anvil 26; the bit sleeve 73, which is disposed on (around) the outer-circumference surface of the anvil 26; the second coil spring 74, which biases the bit sleeve 73 rearward; and the retaining ring 75 (projection part), which is disposed rearward of the second coil spring 74 and projects outward in the radial direction from the anvil 26. The rear portion of the bit sleeve 73 and the retaining ring 75 contact one another when the bit sleeve 73 is disposed at its blocking position. The present embodiment further improves the durability of the anvil 26, thereby improving the durability of the impact driver 1.

The impact driver 1 comprises, e.g.: the motor 21; the anvil 26, which is rotatable by the motor 21; and the tool-holding apparatus 70, which is provided on the tip portion of the anvil 26. According to the present embodiment, the durability of the anvil 26 can be improved, and thereby the durability of the impact driver 1 can be improved.

In addition, in the present embodiment, when the bit B is inserted into the insertion hole 81 without manipulation of the bit sleeve 73, the first coil spring 72 deforms and thereby the balls 71 automatically fall (drop) into the circumferential groove B2 of the bit B. When the bit B is inserted into the insertion hole 81 in the state in which the bit sleeve 73 has been moved forward relative to the anvil 26 (i.e. spaced apart from the retaining ring 75), the first coil spring 72 again deforms and thereby the balls 71 automatically fall into the circumferential groove B2 of the bit B in the same manner as when the bit sleeve 73 has not been manipulated (manually pulled forward). Therefore, the impact driver 1 is provided in which: the bit B can be smoothly mounted on the anvil 26 even without manipulation of the bit sleeve 73; and the bit B can be smoothly mounted on the anvil 26 even in the state in which the bit sleeve 73 has been moved forward. That is, the bit B can be smoothly inserted into the anvil 26 regardless of the axial position of the bit sleeve 73 relative to the anvil 26.

It is noted that, in the embodiment described above, the engaging members of are the balls 71, but the present invention is not limited to this configuration. In addition, although the first biasing member and the second biasing member are the first coil spring 72 and the second coil spring 74, respectively, they are not limited to this configuration and may be, for example, an elastic member such as rubber, polymer (resin), some other type of spring, or the like. In addition, although the positioning part is the retaining ring, such as a circlip or snap ring, it may be a stopper or another type of flange having a different shape.

In addition, in the embodiment described above, the tool-holding apparatus is applied to the impact driver 1 but it may be applied to some other type of electric work machine or power tool such as an angle drill, a driver drill, a rotary hammer, or a hammer drill.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved tool-holding apparatuses, impact drivers and other types of electric work machines or power tools, as well as methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional aspects of the present teachings include, but are not limited to:

1. A tool-holding apparatus (70) comprising:
   a rotational-output shaft (26) having an insertion hole (81) configured to receive a mounting portion (B1) of a tool accessory (B);
   at least one engaging member (71) supported in the rotational-output shaft (26) so as to be movable in an axial direction and a radial direction of the rotational-output shaft (26), the at least one engaging member (71) being configured to engage with the tool accessory (B) when the tool accessory (B) is fully inserted into the insertion hole (81);
   a first biasing member (72), which biases the at least one engaging member (71) in a direction that causes the at least one engaging member (71) to engage with the tool accessory (B);
   a bit sleeve (73), which is movable in the axial direction along an outer-circumferential surface of the rotational-output shaft (26) between a blocking position at which movement of the at least one engaging member (71) outward in the radial direction is blocked and a permitting position at which movement of the at least one engaging member (71) outward in the radial direction is permitted;
   a second biasing member (74), which biases the bit sleeve (74) toward the blocking position; and
   a positioning part (75), which is fixed on the outer-circumferential surface of the rotational-output shaft (26) and stops axial movement of the bit sleeve (73) at the blocking position;
   wherein the bit sleeve (74) has a projection (88), which is disposed on the forward side of the first biasing member (72), extends inward in the radial direction, and is configured to slidably contact the rotational-output shaft (26).

2. The tool-holding apparatus (70) according to the above Aspect 1, wherein the projection (88) is configured to contact the at least one engaging member (71).

3. The tool-holding apparatus (70) according to the above Aspect 1 or 2, wherein:
   the bit sleeve (73) has a step (91), which is provided on an end portion of an inner-circumferential portion of the bit sleeve (73) in the axial direction; and
   the step (91) is arranged such that when the step (91) makes contact with the positioning part (75), the bit sleeve (73) is positioned at the blocking position.

4. The tool-holding apparatus (70) according to any one of the above Aspects 1-3, wherein:
   the first biasing member (72) is a compression coil spring; and
   one end of the compression coil spring (72) in the axial direction contacts the rotational-output shaft (26), and the other end of the compression coil spring (72) in the axial direction contacts the at least one engaging member (71).

5. The tool-holding apparatus (70) according to any one of the above Aspects 1-4, wherein:
   a tilted surface (95) is provided on an inner-circumferential surface of the bit sleeve (73),
   the tilted surface (95) is arranged such that movement of the at least one engaging member (71) outward in the radial direction against the tilted surface (95) causes the bit sleeve (73) to move axially forward relative to the rotational-output shaft (26) against the biasing force of the second biasing member (74); and
   the tilted surface forms an angle ($\theta$) with respect to a line parallel to a rotational axis (AX) of the rotational-output shaft (26) within a range of 45° or greater and 90° or less.

6. The tool-holding apparatus (70) according to any one of the above Aspects 1-5, wherein the bit sleeve (73) has:
   a first recess (89), which is provided on an (the) inner-circumferential surface of the bit sleeve (83) and permits movement of the at least one engaging member (71) outward in the radial direction; and
   a second recess (90), which communicates with the first recess (89) and houses the first biasing member (72) in a compressed state.

7. The tool-holding apparatus (70) according to any one of the above Aspects 1-6, wherein:
   a third recess (83) is provided on the outer-circumferential surface of the rotational-output shaft (26) and supports the first biasing member (72); and
   the third recess (83) has: a bottom (84), whose diameter is smaller than that of the outer-circumferential surface of the rotational-output shaft (26); a wall (85), which is provided on one side of the bottom (84) in the axial direction and to (on) which the first biasing member (72) makes contact; and a tapered portion (76), which is provided on the other side of the bottom (84) in the axial direction and is connected to the outer-circumferential surface of the rotational-output shaft (26).

8. An electric work machine (1) comprising:
   a motor (21);
   the rotational-output shaft (26), which is rotatable by the motor (21); and
   the tool-holding apparatus (70) according to any one of the above Aspects 1-7, which is provided on (at) a tip portion of the rotational-output shaft (26).

9. An impact driver (1) comprising:
   a motor (21);
   a hammer (25), which is rotated by the motor; and
   an anvil part, which is impacted by the hammer (25) in a rotational direction and is disposed on a forward side of the hammer (25);
   wherein:
   the anvil part has: an anvil (26), which is configured to contact the hammer in the rotational direction (26); a substantially hexagonal hole (81), which is formed in the anvil; a slotted hole (82), which extends outward in the radial direction from the substantially hexagonal hole (81); a ball (71), which is disposed in the slotted hole (82); a first elastic body (72), which biases the ball (71); a bit sleeve (73), which is disposed outward in the radial direction of the ball (71); and a second elastic body (74), which biases the bit sleeve;
   when a tool accessory (B) is inserted into the substantially hexagonal hole (81) without manipulation of the bit sleeve (71), the first elastic body (72) deforms, and thereby the ball (71) is urged to automatically fall into a recess (B2) of the tool accessory (B); and when the tool accessory (B) is inserted into the substantially hexagonal hole (81) in a state in which the bit sleeve (73) has been manually moved forward relative to the anvil (26), the first elastic body (72) deforms, and thereby the ball (71) is urged to automatically fall into the recess (B2) of the tool accessory (B).

10. The impact driver (1) according to the above Aspect 9, wherein a rear portion (89, 90) of the bit sleeve (73) is configured to permit movement of the ball (71) outward in the radial direction.

EXPLANATION OF THE REFERENCE NUMBERS

1 Impact driver (electric work machine)
2 Main body
3 Grip (handle)
4 Battery-mounting part
5 Battery pack
6 Switch circuit
7 Trigger switch
8 Forward/reverse-changing lever
10 Operation panel
11 Manipulatable switch
21 Motor
22 Planetary-gear mechanism
23 Spindle
23a Spindle hole
23b Spring-seat projection
24 Spring
25 Hammer
25a Hollow part
26 Anvil (rotational-output shaft)
26a Extension part
26b Hole
26S Contacting, outer-circumferential surface
31 Housing
32 Motor housing
33 Hammer case
34 Grip housing
35 Bearing retainer
36 Screw
41 Rotor
42 Stator
43 Rotor shaft
44 Rotor core
45 Permanent magnet
46 Permanent magnet for sensing
47 Rotor assembly
48 Stator core
49 Front insulating member
50 Rear insulating member
51 Drive coil
52 Sensor board
53 Polymer sleeve
54 Front rotor bearing
55 Pinion
56 Insert bushing
57 Fan
58 Rear rotor bearing
59 Flange
60 Spindle bearing
61 Internal gear
61a Teeth
61b Front portion
61c Recess
62 Planet gear
63 Pin
64 Ball
65 Hammer washer
66 Ball
67 Anvil bearing
68 Chuck
70 Tool-holding apparatus
71 Ball (engaging member)
72 First coil spring (first biasing member, first elastic body)
73 Bit sleeve
74 Second coil spring (second biasing member, second elastic body)
75 Retaining ring (positioning part, projection part)
81 Insertion hole (hole)
82 Slotted hole (hole)
83 Circumferential groove (third recess)
84 Bottom
85 Wall
86 Tapered portion
87 First circumferential groove
88 Projection
88S Contacting, inner-circumferential surface
89 Second circumferential groove
90 Third circumferential groove
91 Step
92 Retaining ring
93 Stopper
94 Groove
95 Tilted surface
AX Rotational axis
B Bit (tool accessory)
B2 Circumferential groove (recess)
θ Angle

We claim:

1. A power tool, comprising:
an anvil defining a rotational-output shaft having an insertion hole, which extends in an axial direction and is configured to receive a mounting shaft of a tool accessory, and a slotted hole extending in a radial direction from the insertion hole to an outer-circumferential surface of the rotational-output shaft;
a hammer configured to rotationally drive the anvil;
a ball disposed in the slotted hole so as to be movable in the axial and radial directions of the rotational-output shaft, the ball and the slotted hole being configured such that the ball is engageable in a first circumferential groove defined in the tool accessory when the tool accessory is fully inserted into the insertion hole;
a first biasing member disposed in a second circumferential groove defined in an outer-circumferential surface of the rotational-output shaft and applying a first biasing force to the ball at least forwardly in the axial direction;
a bit sleeve surrounding the outer-circumferential surface of the rotational-output shaft and having a projection that extends radially inward from an inner-circumferential surface of the bit sleeve, the projection being configured to slidably contact the outer-circumferential surface of the rotational-output shaft;
a second biasing member disposed on the outer-circumferential surface of the rotational-output shaft and applying a second biasing force to the bit sleeve rearwardly in the axial direction; and
a retaining ring extending radially outward from the outer-circumferential surface of the rotational-output shaft, the retaining ring being arranged on the rotational-output shaft at an axial position that defines a blocking position of the bit sleeve;

wherein:

the bit sleeve is configured to be movable in the axial direction relative to the rotational-output shaft from the blocking position, at which a rearward end of the bit sleeve contacts the retaining ring, the projection radially surrounds the ball and blocks movement of the ball radially outward of the outer-circumferential surface of the rotational-output shaft, to a permitting position, at which the projection does not radially surround the ball and thereby radially outward movement of the ball radially outward of the outer-circumferential surface of the rotational-output shaft is not blocked by the projection, and vice versa;

the second circumferential groove includes a wall that extends radially inward from the outer-circumferential surface of the rotational-output shaft;

the retaining ring is spaced apart from the wall in the axial direction;

a first axial end of the first biasing member contacts the wall and a second axial end of the first biasing member contacts the ball; and the first biasing member is a first coil spring having a first inner diameter and the second biasing member is a second coil spring having a second inner diameter; and the first inner diameter is smaller than the second inner diameter.

2. The power tool according to claim 1, wherein the second circumferential groove in the rotational-output shaft is contiguous with the slotted hole.

3. The power tool according to claim 1, wherein:

the second circumferential groove further includes a bottom that extends from a radially-inward-most end of the wall in parallel to the axial direction, the first biasing member has a resting winding radius relative to an axial center of the rotational-output shaft when no force is being applied against the first biasing member, and the resting winding radius is greater than an outer radius of the bottom and is less than an outer radius of the wall.

4. The power tool according to claim 1, further comprising:

a motor;

wherein the hammer is configured to be rotatably driven by the motor to rotatably drive the anvil.

5. The power tool according to claim 4, wherein:

the second circumferential groove further includes a bottom that extends from a radially-inward-most end of the wall in parallel to the axial direction, the first biasing member has a resting winding radius relative to an axial center of the rotational-output shaft when no force is being applied against the first biasing member, and the resting winding radius is greater than an outer radius of the bottom and is less than an outer radius of the wall.

6. The power tool according to claim 5, wherein:

the projection is disposed between the first and second coil springs in the axial direction; and the second coil spring contacts a first radially-extending surface of the projection.

7. The power tool according to claim 6, wherein the first coil spring is configured to also apply a radially-inward biasing force to the ball.

8. The power tool according to claim 7, wherein the second circumferential groove in the anvil is contiguous with the slotted hole.

9. An impact driver comprising:

a motor;

a spindle operably connected to the motor and disposed forward of the motor in an axial direction;

a hammer configured to be rotated by the spindle;

an anvil having a rotational-output shaft and configured to be impacted by the hammer in a rotational direction and disposed forward of the hammer in the axial direction, the anvil having an axially-extending hole and a radially-extending hole;

a bearing supporting the anvil in a rotatable manner;

a ring disposed forward of the bearing and surrounding the anvil;

a bit sleeve disposed to be movable along the anvil in the axial direction and having a rearward end that is abuttable against the ring, the bit sleeve being prevented from moving rearward beyond a blocking position at which the rearward end abuts the ring;

a ball movably disposed in the radially-extending hole;

a rear elastic body disposed in an interior of the bit sleeve forward of the ring in the axial direction, the rear elastic body biasing the ball;

a front elastic body disposed in the interior of the bit sleeve and biasing the bit sleeve rearward in the axial direction; and a front retaining ring disposed in the interior of the bit sleeve forward of the front elastic body;

wherein:

the ring and the bearing at least partially overlap each other when viewed in the axial direction, and an inner diameter of at least a portion of the rear elastic body is smaller than an inner diameter of the ring.

10. The impact driver according to claim 9, wherein:

the rear elastic body is disposed in a circumferential groove that is spaced apart from the ring in the axial direction, and a rear end of the rear elastic body contacts a wall of the circumferential groove that has an outer diameter smaller than an outer diameter of the ring.

11. The impact driver according to claim 10, wherein the circumferential groove further includes:

a bottom that extends from a radially-inward-most end of the wall in parallel to the axial direction, and a tapered portion that connects the bottom and the outer-circumferential surface of the anvil in an inclined manner.

12. The impact driver according to claim 11, wherein the rear elastic body applies a radially-inward biasing force to the ball.

13. The impact driver according to claim 12, wherein:

the rear elastic body has a resting winding radius relative to an axial center of the anvil when no force is being applied against the first biasing member, and the circumferential groove, the ball and the radially-extending hole are configured such that, when a tool accessory is not inserted in the axially-extending hole and the ball is located at its radially inward-most position, the resting winding radius of the rear elastic body is greater than a radial distance between the axial center of the anvil and a radially-outermost edge of the ball.

14. The impact driver according to claim 13, wherein:

a projection extends radially inward from an inner-circumferential surface of the bit sleeve, the projection being configured to slidably contact the outer-circumferential surface of the anvil;
the projection is disposed between the front and rear elastic bodies in the axial direction; and
the front elastic body contacts a first radially-extending surface of the projection.

15. The impact driver according to claim 14, wherein:
a third circumferential groove is defined in an inner circumferential surface of the bit sleeve axially rearward of the projection;
a tilted surface is defined on a second surface of the projection that is axially opposite of the first radially-extending surface, the tilted surface being contiguous with the third circumferential groove;
the tilted surface forms an angle with respect to a line parallel to a rotational axis of the anvil of 45°-90°;
the tilted surface is arranged such that radially-outward movement of the ball against the tilted surface causes the bit sleeve to move axially forward relative to the anvil against a biasing force of the front elastic body; and
the third circumferential groove is configured to permit the rear elastic body and the ball to move radially outward of the outer-circumferential surface of the anvil when the bit sleeve is disposed at a permitting position, at which the projection does not radially surround the ball and thereby radially outward movement of the ball radially outward of the outer-circumferential surface of the anvil is not blocked by the projection.

16. The impact driver according to claim 15, wherein the front elastic body has a resting winding radius that is greater than the resting winding radius of the rear elastic body.

17. The impact driver according to claim 9, wherein a tool accessory is insertable into the axially-extending hole regardless of the axial position of the bit sleeve relative to the anvil.

18. The impact driver according to claim 9, wherein:
the rear elastic body is a first coil spring having a first inner diameter and the front elastic body is a second coil spring having a second inner diameter; and
the first inner diameter is smaller than the second inner diameter.

19. The impact driver according to claim 9, wherein:
the radially-extending hole is a slotted hole elongated in axial direction and configured such that the ball is engageable in a first circumferential groove defined in a tool accessory when the tool accessory is fully inserted into the axially-extending hole;
the bit sleeve surrounds the outer-circumferential surface of the rotational-output shaft and has a projection that extends radially inward from an inner-circumferential surface of the bit sleeve, the projection slidably contacting the outer-circumferential surface of the rotational-output shaft and radially surrounding the ball when the bit sleeve is located at the blocking position; and
the rear elastic body is a coil spring configured to bias the ball forward in the axial direction.

20. An impact driver comprising:
a motor;
a spindle operably connected to the motor and disposed forward of the motor in an axial direction;
a hammer configured to be rotated by the spindle;
an anvil having a rotational-output shaft configured to be impacted by the hammer in a rotational direction and disposed forward of the hammer in the axial direction, the anvil having an axially-extending hole and a radially-extending hole;
a rear retaining ring fixed to an outer-circumferential surface of the anvil;
a bit sleeve having a rearward end configured to contact the rear retaining ring;
a ball movably disposed in the radially-extending hole;
a circumferential groove defined in the anvil and having a bottom;
a rear elastic body disposed in an interior of the bit sleeve forward of the rear retaining ring in the axial direction, the rear elastic body contacting the bottom of the circumferential groove and biasing the ball;
a front elastic body disposed in the interior of the bit sleeve and biasing the sleeve rearward in the axial direction; and
a front retaining ring disposed in the interior of the bit sleeve forward of the front elastic body;
wherein the front elastic body has an inner diameter that is larger than an inner diameter of the rear elastic body.

* * * * *